(12) United States Patent
Krishnaswamy et al.

(10) Patent No.: US 9,083,474 B2
(45) Date of Patent: Jul. 14, 2015

(54) MULTIMEDIA BROADCAST FORWARDING SYSTEMS AND METHODS

(75) Inventors: Dilip Krishnaswamy, San Diego, CA (US); Vijayalakshmi R. Raveendran, San Diego, CA (US); Robert S. Daley, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 425 days.

(21) Appl. No.: 12/430,762

(22) Filed: Apr. 27, 2009

(65) Prior Publication Data

US 2009/0268807 A1 Oct. 29, 2009

Related U.S. Application Data

(63) Continuation-in-part of application No. 12/109,948, filed on Apr. 25, 2008, now Pat. No. 8,638,810.

(51) Int. Cl.
*H04H 20/08* (2008.01)
*H04W 72/02* (2009.01)
*H04H 20/42* (2008.01)
*H04H 60/92* (2008.01)
*H04W 4/06* (2009.01)
*H04W 88/06* (2009.01)

(52) U.S. Cl.
CPC .............. *H04H 20/08* (2013.01); *H04W 72/02* (2013.01); *H04H 20/42* (2013.01); *H04H 60/92* (2013.01); *H04W 4/06* (2013.01); *H04W 88/06* (2013.01)

(58) Field of Classification Search
None
See application file for complete search history.

(56) References Cited

U.S. PATENT DOCUMENTS

| 6,122,514 | A | 9/2000 | Spaur et al. | |
|---|---|---|---|---|
| 6,167,058 | A | 12/2000 | Ward et al. | |
| 6,470,378 | B1 * | 10/2002 | Tracton et al. | 709/203 |
| 6,981,045 | B1 * | 12/2005 | Brooks | 709/226 |
| 7,720,027 | B2 | 5/2010 | Ling et al. | |
| 7,733,819 | B2 | 6/2010 | Lee et al. | |

(Continued)

FOREIGN PATENT DOCUMENTS

| CN | 1902843 A | 1/2007 |
|---|---|---|
| CN | 101107854 A | 1/2008 |

(Continued)

OTHER PUBLICATIONS

International Search Report & Written Opinion—PCT/US2009/052498, International Search Authority—European Patent Office—Apr. 19, 2010.

(Continued)

*Primary Examiner* — Cai Chen

(57) ABSTRACT

In various embodiments, communication apparatus and methods for providing robust communications are disclosed. For example, an exemplary communication apparatus for distributing media to one or more receiving apparatus may include receiving circuitry to receive a first wireless multimedia broadcast signal containing at least a first media stream, transmitting circuitry to wirelessly transmit one or more individual media streams simultaneously to the one or more receiving apparatus using one or more wireless transmit signals, and decision circuitry configured to control the transmitting circuitry to transmit the first media stream to at least one receiving apparatus using at least one wireless transmit signal type based on a forward-link data capacity of each wireless channel between the transmitting circuitry and each receiving apparatus.

24 Claims, 14 Drawing Sheets

(56) References Cited

U.S. PATENT DOCUMENTS

| | | | |
|---|---|---|---|
| 7,751,780 B2 | 7/2010 | Saidi et al. | |
| 7,751,838 B2 | 7/2010 | Ramesh et al. | |
| 8,135,852 B2 | 3/2012 | Nilsson et al. | |
| 8,195,744 B2 | 6/2012 | Julia et al. | |
| 2002/0031120 A1* | 3/2002 | Rakib | 370/386 |
| 2003/0136698 A1* | 7/2003 | Klatt | 206/499 |
| 2004/0148638 A1 | 7/2004 | Weisman et al. | |
| 2004/0148683 A1* | 8/2004 | Lindaman | 2/207 |
| 2005/0068965 A1 | 3/2005 | Lin et al. | |
| 2005/0097595 A1* | 5/2005 | Lipsanen et al. | 725/25 |
| 2005/0170859 A1 | 8/2005 | Koike et al. | |
| 2005/0173283 A1 | 8/2005 | Allison | |
| 2005/0223229 A1 | 10/2005 | Roeder et al. | |
| 2005/0239443 A1 | 10/2005 | Watanabe et al. | |
| 2006/0117371 A1 | 6/2006 | Margulis | |
| 2006/0146823 A1 | 7/2006 | Ding | |
| 2006/0168261 A1 | 7/2006 | Serval et al. | |
| 2006/0190972 A1 | 8/2006 | Kasamatsu et al. | |
| 2007/0055873 A1 | 3/2007 | Leone et al. | |
| 2007/0072610 A1 | 3/2007 | Qiao et al. | |
| 2007/0101352 A1* | 5/2007 | Rabina et al. | 725/1 |
| 2007/0136758 A1* | 6/2007 | Lehikoinen et al. | 725/53 |
| 2007/0253394 A1 | 11/2007 | Horiguchi et al. | |
| 2007/0286102 A1 | 12/2007 | Shimokawa et al. | |
| 2008/0026756 A1 | 1/2008 | Harris et al. | |
| 2008/0056662 A1 | 3/2008 | Ikeda et al. | |
| 2008/0080430 A1 | 4/2008 | Choi et al. | |
| 2008/0161002 A1 | 7/2008 | Karimi et al. | |
| 2008/0263623 A1* | 10/2008 | Hildebrand et al. | 725/152 |
| 2009/0268649 A1 | 10/2009 | Krishnaswamy | |
| 2010/0034149 A1 | 2/2010 | Lederer et al. | |
| 2010/0111104 A1 | 5/2010 | Luss | |
| 2011/0197234 A1* | 8/2011 | Gordon et al. | 725/62 |

FOREIGN PATENT DOCUMENTS

| | | |
|---|---|---|
| EP | 1237328 A2 | 9/2002 |
| EP | 2001234 A1 | 12/2008 |
| JP | 2000183836 A | 6/2000 |
| JP | 2002354439 A | 12/2002 |
| JP | 2003018563 A | 1/2003 |
| JP | 2005151443 A | 6/2005 |
| JP | 2006506894 A | 2/2006 |
| JP | 2006074269 A | 3/2006 |
| JP | 2006074270 A | 3/2006 |
| JP | 2007300419 A | 11/2007 |
| JP | 2008066897 A | 3/2008 |
| JP | 2008517501 A | 5/2008 |
| JP | 2008211583 A | 9/2008 |
| JP | 2009543412 A | 12/2009 |
| JP | 2010532961 A | 10/2010 |
| KR | 20090006587 A | 1/2009 |
| WO | WO9829975 A2 | 7/1998 |
| WO | WO-2004046850 A2 | 6/2004 |
| WO | WO-2006045436 A1 | 5/2006 |
| WO | WO-2008001308 A2 | 1/2008 |
| WO | WO-2009007217 A1 | 1/2009 |
| WO | WO2009007600 | 1/2009 |

OTHER PUBLICATIONS

International Search Report and Written Opinion—PCT/US2009/041710, International Searching Authority—European Patent Office, Aug. 24, 2010.

Schierl T et al: "Mobile Video Transmission Using Scalable Video Coding" IEEE Transactions on Circuits and Systems for Video Technology, IEEE Service Center, Piscataway, NJ, US LNKDDOI: 10.1109/TCSVT.2007.905528, vol. 17, No. 9, Sep. 1, 2007, pp. 1204-1217, XP011193018 ISSN: 1051-8215 the whole document.

Sigle, R (Alcatel): "MRA-Architecture, Mobile and Wireless Systems beyond 3G", Feb. 17, 2005, Document IST-2002-507134-AN/WP2/D02, XP002337899. (70 pages).

Taiwan Search Report—TW098125924—TIPO—Aug. 9, 2012.

Dimou et al., "Generic link Layer, A Solution for Multiradio Transmission Diversity in Communication Network Beyond 3G", 2005, IEEE, pp. 1-5.

Sachs, "A Generic link Layer for Future Generation Wireless networking", 2003, IEEE, pp. 1-5.

Johnsson M., et al., "Ambient Networks—A Framework for Multi-Access Control in Heterogeneous Networks", IEEE 64th Vehicular Technology Conference, Sep. 2006, pp. 1-5.

Magnusson P., et al., "Multi-Radio Resource Management for Communication Networks beyond 3G", IEEE 62nd Vehicular Technology Conference, Sep. 2005, vol. 3, pp. 1653-1657.

Sachs J., et al., "A Generic Link Layer in a Beyond 3G Multi-Radio Access Architecture", International Conference on Communications, Circuits and Systems, Jun. 2004, vol. 1, pp. 447-451.

* cited by examiner

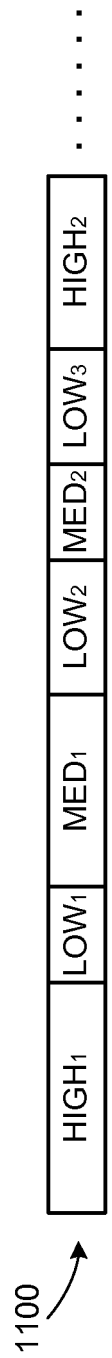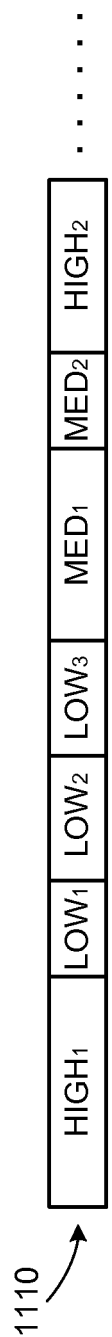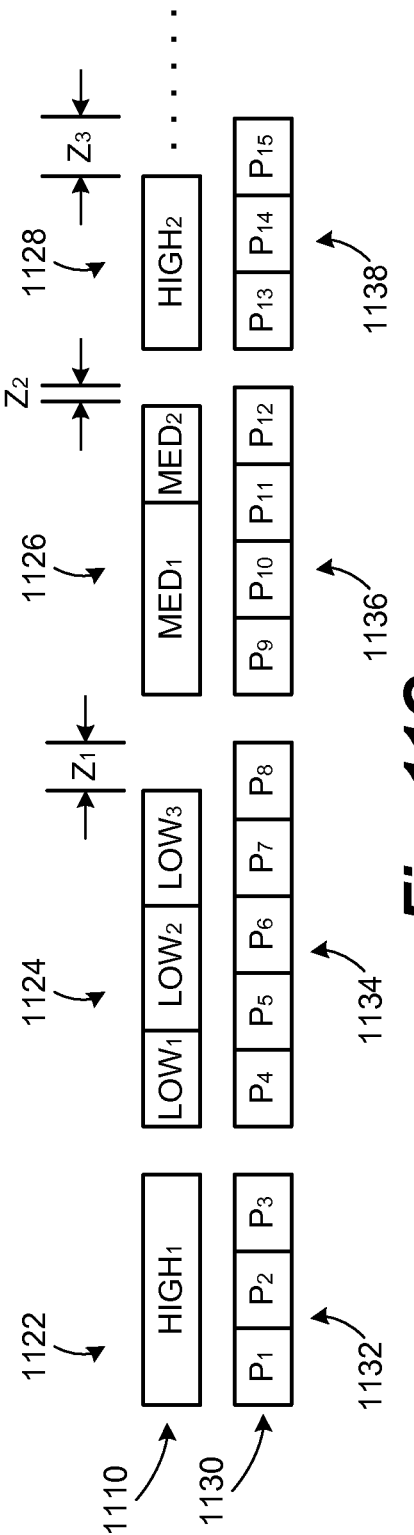

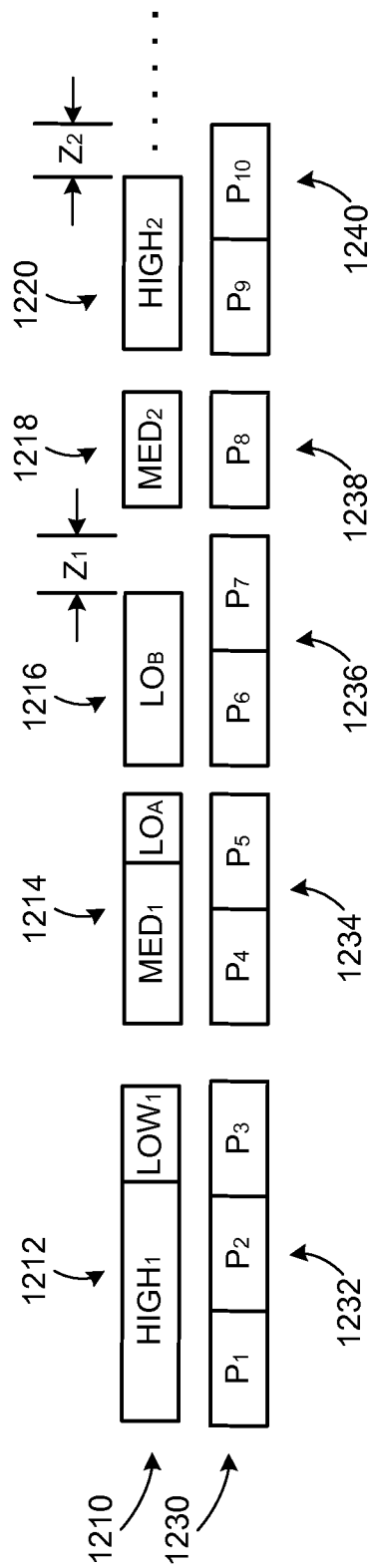
Fig. 12A
Fig. 12B

MULTIMEDIA BROADCAST FORWARDING SYSTEMS AND METHODS

This Continuation-in-Part Application incorporates the entire content of U.S. patent application Ser. No. 12/109,948, filed on Apr. 25, 2008, now U.S. Pat. No. 8,638,810, issued Jan. 28, 2014, entitled "Multiradio-Database Systems and Methods". The contents of the above-cited application are incorporated by reference in their entirety for all purposes.

BACKGROUND

1. Field

This disclosure relates to wireless communication. More particularly, this disclosure relates to methods and systems for sending and receiving real-time communications using adaptive protocols.

2. Background

The evolution of mobile telephone technology has produced a number of advancements that have little to do with traditional telephony, but are now considered standard components for most cellular telephones. For example, modern cellular phones are capable of sending and receiving text messages, accessing the internet and displaying multimedia files.

One particular service now available to cellular telephones (and similarly enabled devices) is the ability to wirelessly receive and then play music, movies, music videos and television programming. The content for these services is typically sent across special high-capacity Digital Video Broadcasting (DVB)/Forward Link Only (FLO) wireless networks, such as Qualcomm's MediaFLO® system.

DVB is a technology that enables an efficient and economical distribution of the same multimedia content to millions of wireless subscribers simultaneously. DVB technology can allow for a reduction in costs associated with the delivery of media, and allow users to "surf" channels of content on mobile handsets more typically associated with cellular voice and data services.

In operation, a DVB network typically formats, bundles and encrypts various media streams, then applies some form of error detection and correction scheme to abate errors generated during transmission. Once transmitted and subsequently received, the DVB multimedia streams can be corrected for errors (to the extent possible), unbundled and decrypted before being played.

Unfortunately, practical limits on cellular telephones are not always conducive to consumer enjoyment. For example, cellular telephones may not have the video resolution or audio performance to fully exploit the available DVB content. Accordingly, it may be desirable to develop new technologies that may expand the desirability of DVB media systems.

SUMMARY

A wireless communication device is used to distribute media, such as broadcast media, to one or more receiving apparatus. A first wireless multimedia broadcast signal containing at least a first media stream is received. Individual media streams are extracted from the received multimedia broadcast signal. One or more of the individual media streams are transmitted simultaneously to the receiving apparatus using one or more wireless transmit signals. The transmissions are controlled, for example by decision circuitry, so as to transmit the first media stream to at least one receiving apparatus using at least one wireless transmit signal type based on a forward-link data capacity of each wireless channel between the transmitting circuitry and each receiving apparatus.

BRIEF DESCRIPTION OF THE DRAWINGS

The features and nature of the present disclosure will become more apparent from the detailed description set forth below when taken in conjunction with the accompanying drawings in which reference characters identify corresponding items.

FIGS. 11A-11C depict various stages of a stream of data undergoing differential outer-coding sequence according to a particular set of embodiments.

FIGS. 12A-12B depict various stages of a stream of data undergoing a second differential outer-coding sequence according to a particular set of embodiments.

DETAILED DESCRIPTION

Overview

Figure 1:
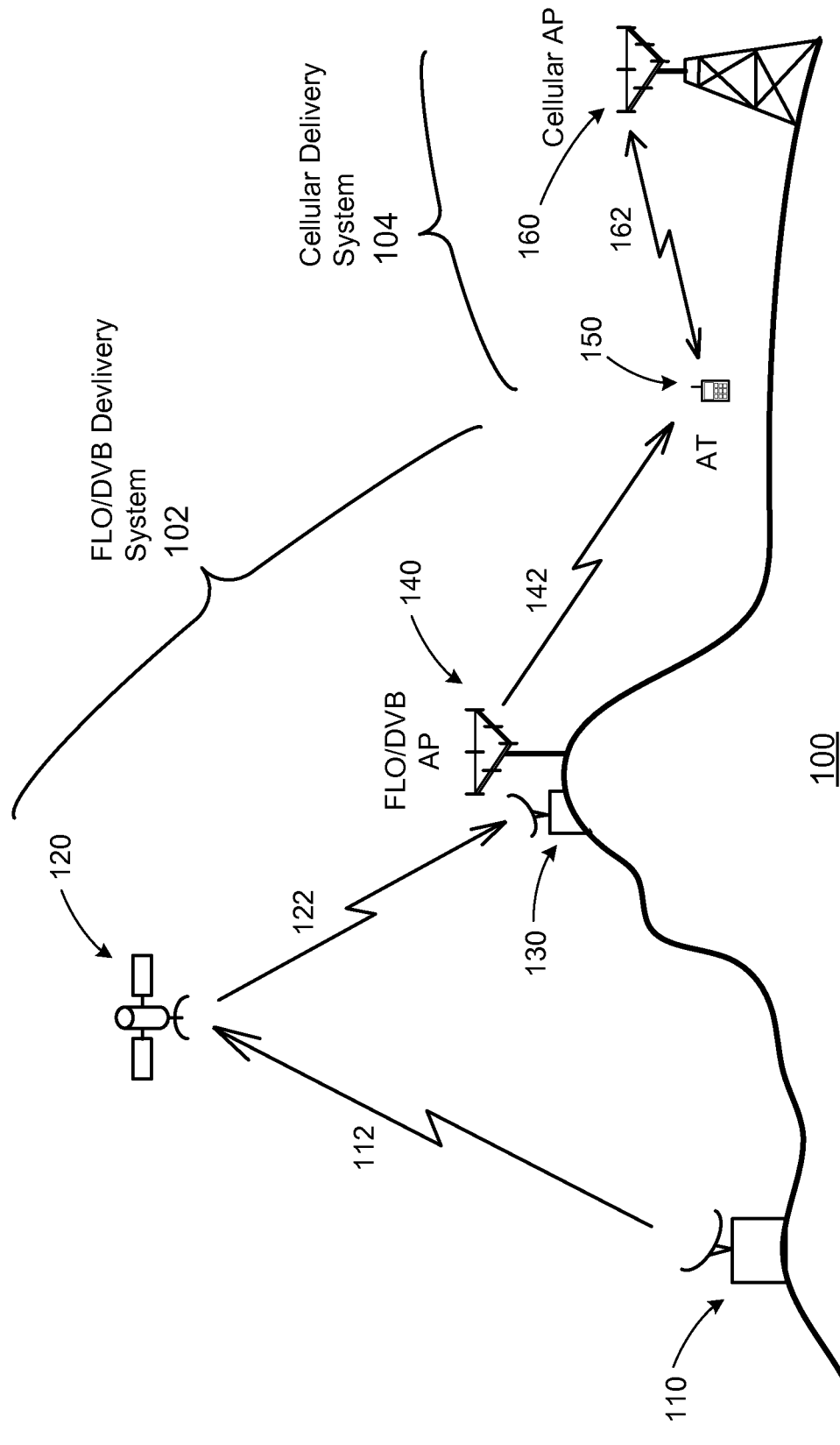
FIG. 1 depicts an exemplary communication system capable of both cellular communications and Forward Link Only (FLO) media delivery.

The disclosed methods and systems below may be described generally, as well as in terms of specific examples and/or specific embodiments. For instances where references are made to detailed examples and/or embodiments, it should be appreciated that any of the underlying principals described are not to be limited to a single embodiment, but may be expanded for use with any of the other methods and systems described herein as will be understood by one of ordinary skill in the art unless otherwise stated specifically.

Multimedia broadcast transmissions are accomplished with a multimedia broadcast signal which may follow any of a variety of protocols. Examples of such protocols include Forward Link Only (FLO), DVB-H, DVB-SH, ATSC M/H, DVB-T, ISDB-T and S-DMB signals. The broadcast signal would therefore include one or more signals selected from that group of protocols or from other protocols which may be in present or future use. These signal protocols may, for example, be used as TV broadcast signals.

Each stream may be a different media broadcast such as a different TV channel. The broadcast signal contains many such streams (many TV channels) which are received. The retrieval of this information utilizes extraction circuitry which is capable of extracts any required stream or is capable of extracting any stream from a subset of the streams. The transmission circuitry forwards the streams needed by clients.

A multicast function may be performed in the next hop, which allows the multimedia broadcast to be forwarded to other clients. There are many ways to multicast, and the selection of the multicast technique depends on the particular device capabilities and the particular environment. By way of example, if two people in the backseat of a car want to watch a program from NBC, and if each such person has their own personal wireless display, then those two displays together form a multicast group. Now the passenger next to the driver may want to watch CNN (i.e., a different broadcast), then that is a different multicast group with just one client. In this example, the device serves up two streams, CNN to the display for the passenger next to the driver, and NBC to the backseat display.

Thus, the broadcast reception at a first device is distinct from the multicast used to forward the broadcast to nearby clients. Also, the forwarding may not be a multicast if there is only one client that may receive—in which case a single stream is forwarded to one client.

For the purpose of explanation, the present disclosure provides the examples of implementation in a cellular telephone; however, it is to be appreciated that the methods and systems disclosed below may relate to both mobile and non-mobile systems including mobile phones, PDAs and lap-top PCs, as well as any number of specially equipped/modified music players (e.g., a modified Apple iPOD®), video players, multimedia players, televisions (stationary, portable and/or installed in a vehicle), electronic game systems, digital cameras and video camcorders.

Also, for the purpose of this disclosure, a Forward Link Only (FLO) system may be characterized as a type of Digital Video Broadcasting (DVB) system used to transport bundled media to an end device, such as a suitably enabled cellular phone capable of playing the media streams. For FLO and other DVB systems, media delivery is made without the benefit of re-transmitting packets of data that are unsuccessfully received by the end devices as is generally done on systems using TCP/IP protocols or on DVD players, which may be made to re-read various sectors of an optical disk.

While a generic DVB media delivery system is described herein for simplicity of explanation, the methods and systems may be applied to any number of DVB standards that are either in effect or are at various stages of development, including Europe's DVB-H standard, Japan's ISDB-T standard, Korea's digital audio broadcasting (DAB)-based Terrestrial-DMB and Satellite-DMB standards, China's DTV-M standard, Terrestrial-Mobile Multimedia Broadcasting (T-MMB) and Satellite and terrestrial interaction multimedia (STiMi) standards, the Advanced Television Systems Committee (ATSC) standard(s), the third generation partnership project Multimedia Broadcast/Multicast Services (3GPP MBMS) or Broadcast/Multicast Service (3GPP2 BCMCS) standards. Still further, the methods and systems may be applied to emerging standards, such as the MediaFLO® standard proposed by Qualcomm, Inc. of San Diego, Calif.

It is anticipated that further developments in multimedia technology will result in the use of different protocols for achieving multimedia broadcasts in the future. The techniques described herein are expected to be useful for implementing such future multimedia broadcast protocols.

In a series of configurations, a method for providing robust communications includes selecting a media-coding scheme from a plurality of available media-coding schemes based on at least one of a wireless communication standard used between a set of available transmitting circuitry and a receiving apparatus, a data transfer capacity of a wireless channel between the transmitting circuitry and the receiving apparatus, and information provided by the receiving apparatus about at least one physical characteristic of the receiving apparatus, encoding a first stream of data using the selected media-coding scheme to produce an media-coded stream of data, and transmitting the media-coded stream of data to the receiving apparatus.

In another series of configurations, a communication apparatus for providing robust communications includes a coding means for media-coding a first stream of data using one of a plurality of available media-coding schemes to produce a media-coded stream of data, a transmitting means for wirelessly transmitting the media-coded stream of data to a receiving apparatus, and a first selection means for automatically selecting a media-coding for the media-coded stream of data based on at least one of a wireless communication standard used between the transmitting circuitry and the receiving apparatus, a data transfer capacity of a wireless channel between the transmitting circuitry and the receiving apparatus, and information provided by the receiving apparatus about a physical characteristic of the receiving apparatus.

In still another series of configurations, a method for providing robust communications between a communications bridge receiving a Forward Link Only (FLO) media stream and a receiving apparatus includes receiving from the receiving apparatus a set of first information from the receiving apparatus, extracting a first stream of data from the DVB/FLO media stream, encoding the first stream to use one of a plurality of available media-coding schemes based on the first information received from the receiving apparatus, and transmitting the media-coded stream of data to the receiving apparatus.

In yet another series of configurations, a communication apparatus for providing robust communications includes a receiving circuit configured to receive a stream of multimedia data via a wireless channel, the multimedia data being encoded according to at least one media-coding scheme, a media decoding circuit configured to decode the received multimedia data stream according to any of a plurality of media-coding schemes to produce an output stream of multimedia data, a selection circuit configured to select one or more media-coding schemes for the media decoding circuit based upon information encapsulated within the stream of multimedia data, and a display screen capable of displaying at least a portion of the multimedia data of the output stream of multimedia data.

In yet another series of configurations, a method for providing robust communications includes receiving a steam of multimedia data encoded according to at least one media-coding scheme using a wireless channel, decoding the received multimedia data stream based on at least one of a wireless communication standard used to receive the steam of multimedia data and a data transfer capacity of a wireless channel used to receive the steam of multimedia data to produce an output stream of multimedia data, and displaying at least a portion of the multimedia data of the output stream of multimedia data.

In still another series of configurations, a communication apparatus for providing robust communications includes a receiving means for receiving a stream of multimedia data via a wireless channel, the multimedia data being encoded according to at least one media-coding scheme, a media decoding means for decoding the received multimedia data stream according to any of a plurality of media-coding schemes to produce an output stream of multimedia data, a selection means for selecting one or more media-coding schemes for the media decoding means based upon information encapsulated within the stream of multimedia data, and a display means capable of displaying at least a portion of the multimedia data of the output stream of multimedia data.

In another series of configurations, a method for providing robust communications includes selecting a media-coding scheme from a plurality of available media-coding schemes based on at least one of a wireless communication standard used between a set of available transmitting circuitry and a receiving apparatus, a data transfer capacity of a wireless channel between the transmitting circuitry and the receiving apparatus, and information provided by the receiving apparatus about at least one physical characteristic of the receiving apparatus, encoding a first stream of data using the selected media-coding scheme to produce a media-coded stream of data, and transmitting the media-coded stream of data to the receiving apparatus.

In yet another series of configurations, a communication apparatus for providing robust communications includes a coding means for media-coding a first stream of data using one of a plurality of available media-coding schemes to produce a media-coded stream of data, a transmitting means for wirelessly transmitting the media-coded stream of data to a receiving apparatus, and a first selection means for automatically selecting a media-coding for the media-coded stream of data based on at least one of a wireless communication standard used between the transmitting circuitry and the receiving apparatus, a data transfer capacity of a wireless channel between the transmitting circuitry and the receiving apparatus, and information provided by the receiving apparatus about a physical characteristic of the receiving apparatus.

In still another series of configurations, a method for providing robust communications between a communications bridge receiving a Forward Link Only (FLO) media stream and a receiving apparatus includes receiving from the receiving apparatus a set of first information from the receiving apparatus, extracting a first stream of data from the DVB/FLO media stream, encoding the first stream to use one of a plurality of available media-coding schemes based on the first information received from the receiving apparatus, and transmitting the media-coded stream of data to the receiving apparatus.

In yet another series of configurations, a communication apparatus for providing robust communications includes a receiving circuit configured to receive a stream of multimedia data via a wireless channel, the multimedia data being encoded according to at least one media-coding scheme, a media decoding circuit configured to decode the received multimedia data stream according to any of a plurality of media-coding schemes to produce an output stream of multimedia data, a selection circuit configured to select one or more media-coding schemes for the media decoding circuit based upon information encapsulated within the stream of multimedia data, and a display screen capable of displaying at least a portion of the multimedia data of the output stream of multimedia data.

In yet another series of configurations, a method for providing robust communications includes receiving a steam of multimedia data encoded according to at least one media-coding scheme using a wireless channel, decoding the received multimedia data stream based on at least one of a wireless communication standard used to receive the steam of multimedia data and a data transfer capacity of a wireless channel used to receive the steam of multimedia data to produce an output stream of multimedia data, and displaying at least a portion of the multimedia data of the output stream of multimedia data.

In still another series of configurations, a communication apparatus for providing robust communications includes a receiving means for receiving a stream of multimedia data via a wireless channel, the multimedia data being encoded according to at least one media-coding scheme, a media decoding means for decoding the received multimedia data stream according to any of a plurality of media-coding schemes to produce an output stream of multimedia data, a selection means for selecting one or more media-coding schemes for the media decoding means based upon information encapsulated within the stream of multimedia data, and a display means capable of displaying at least a portion of the multimedia data of the output stream of multimedia data.

DVB/FLO Media Delivery System

FIG. 1 depicts an exemplary communication system 100 capable of both cellular communication and DVB/FLO media delivery. As shown in FIG. 1, the exemplary communication system 100 includes a first wireless unit 150 which may be a cellular telephone or similar wireless device. The first wireless unit 150 is serviced by two communications systems including: (1) a DVB/FLO media delivery system 102, and (2) a cellular communication system 104.

The exemplary DVB/FLO media delivery system 102 includes a ground-based data source 110, a first satellite 120, a first ground-based DVB/FLO receiver 130, a local DVB/FLO transmission access point 140 which establishes wireless link 142 with first wireless unit 150

The exemplary cellular communication system 104 includes a local cellular access point 160 attached to a more expansive network of other cellular access points (not shown) via backhaul connections (also not shown), and which establishes wireless link 162 with first wireless unit 150.

In operation, various media streams, such as television programming, radio programming and movies, may be appropriately formatted, compressed, bundled and error-coded as may be found necessary or beneficial for a particular DVB standard either at the ground-based data source 110 or by another system in contact with the ground-based data source 110. The ground-based data source 110 may then transmit the resultant DVB/FLO content to the first satellite 120 via wireless channel 112. In turn, the first satellite 120 may rebroadcast the received DVB/FLO content to a number of other devices, including the ground-based DVB/FLO receiver 130 via wireless channel 122. The ground-based DVB/FLO receiver 130 may then provide the DVB/FLO content to the DVB/FLO transmission access point 140, which in turn may re-broadcast the DVB/FLO content to the first wireless unit 150 and other devices.

Once received by the first wireless unit 150, the various media streams embedded in the DVB/FLO content may be extracted so as to be played by the first wireless unit 150 and/or advantageously forwarded to any number of other devices using a number of novel processes as will be further described below.

While the example of FIG. 1 shows but a single respective data path each for both media delivery and cellular services, it should be appreciated that practical/deployed configurations of both the DVB/FLO media delivery system 102 and a cellular communication system 104 may include redundant systems with each systems having multiple DVB/FLO access points, multiple intermediate satellite channels and possibly direct satellite feeds.

For example, the exemplary cellular communication system 104 may include four or five cellular access points actively communicating with the first wireless unit 150 with a first cellular access point transmitting payload data to the cellular telephone and two other cellular access points receiving payload data from the first wireless unit 150. Similarly, the exemplary DVB/FLO media delivery system 102 may be complemented by multiple DVB/FLO transmission access points each receiving media content from satellite 120 and re-broadcasting the media content across overlapping geographic regions, while redundant information may be provided separately to the first wireless unit 150 directly from a separate DVB/FLO-enabled satellite.

Given the means of DVB/FLO content distribution, it should be appreciated that retransmission of any portion of DVB/FLO content based on erroneous reception by any of possibly millions of receiving devices can be impractical, especially in light of the high data rates and onerous real-time processing that might be required for acceptable consumer enjoyment.

Figure 2:
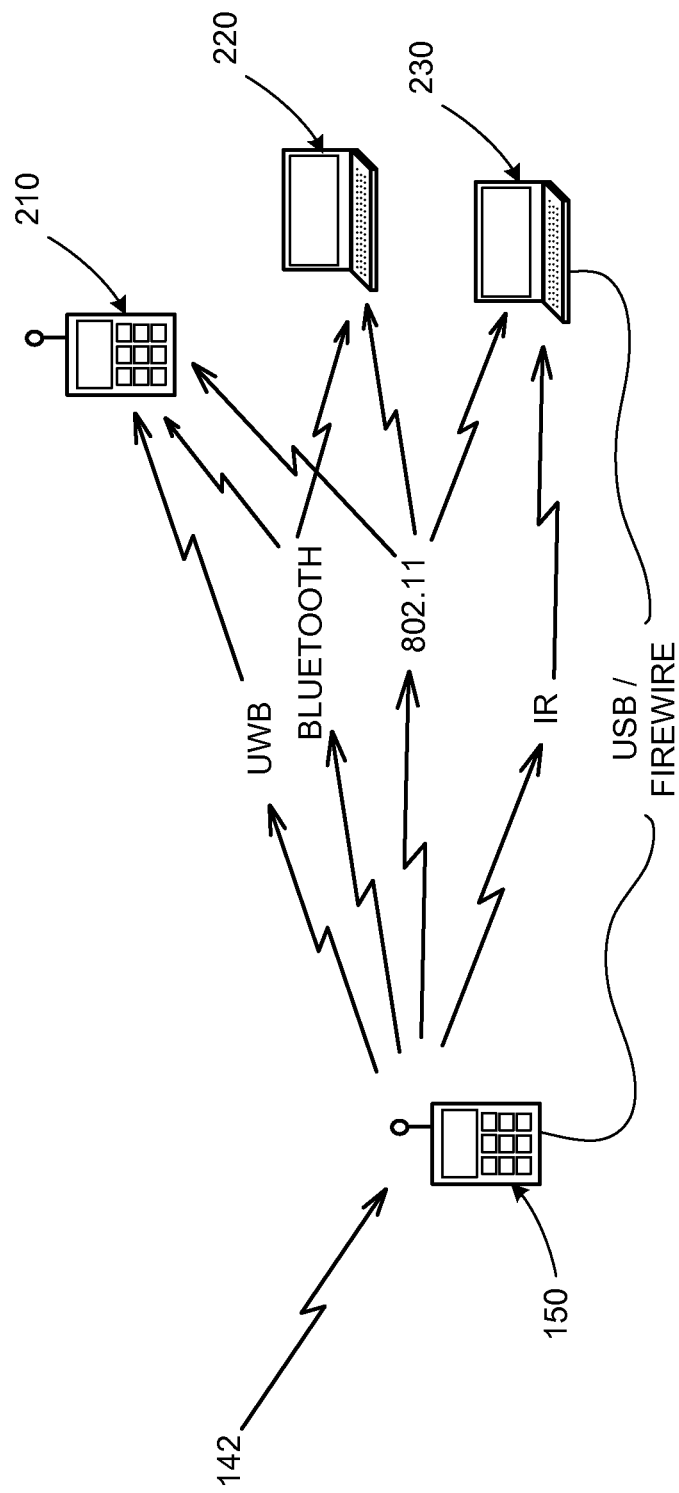
FIG. 2 depicts the cellular telephone of FIG. 1 forwarding media signals to other devices via a variety of communications channels.

As mentioned above, DVB/FLO content received by the first wireless unit 150 may be advantageously forwarded to other devices in an array of novel manners. FIG. 2 depicts the first wireless unit 150 of FIG. 1 forwarding media content to a number of receiving devices, including a cellular telephone 210 and personal computers 220 and 230. As depicted in FIG. 2, a variety of communications channels may connect the first wireless unit 150 and the receiving devices 210, 220 and 230 including an Ultra-Wide Band (UWB) channel, a Bluetooth channel, an 802.22 channel, an infrared (IR) channel and a Universal Serial Bus (USB) and/or a Firewire (e.g., IEEE 1394) channel. However, it should be appreciated that such communication channels may take any number of other forms including ZigBee (802.15) channels, ATSC channels, Wibree channels, Wireless HD channels, Wireless USB channels and so on.

Additionally, while the exemplary receiving devices 210, 220 and 230 are shown as a cellular telephone 210 and personal computers 220 and 230, in various embodiments receiving devices may range in form to include any number of devices such as mobile phones, PDAs, PCs, specially equipped/modified music players, video players, multimedia players, televisions, electronic game systems, digital cameras, video camcorders and so on.

In operation, as DVB/FLO content is received by the first wireless unit 150 via wireless channel 142, the first wireless unit 150 may play any particular media stream embedded in the DVB/FLO content directly and/or forward one or more media streams (or even the entire DVB/FLO content) to any or all of devices 210, 220 and 230.

In a number of configurations, a DVB/FLO content forwarding channel may be automatically selected based on the underlying technology having the highest data transfer capacity. For example, if the first wireless unit 150 is in contact with receiving device 210 using the UWB channel (≤2 Gbits/sec), the Bluetooth channel (≤2.1 Mbits/sec) and the 802.11 channel (≤54 Mbits/sec), the first wireless unit 150 may choose the UWB channel to forward DVB/FLO content due to its relatively large data transfer capacity.

Similarly, if the first wireless unit 150 is required to transmit DVB/FLO content to both receiving devices 210 and 220, the first wireless unit 150 may choose the UWB channel to forward DVB/FLO content to device 210 while choosing the Bluetooth channel for device 220, or possibly opt to use the Bluetooth channel for both receiving devices 210 and 220. That is, the first wireless unit 150 may choose separate data channels to each of receiving devices 210 and 220, or choose a common wireless channel having the greatest data capacity to forward DVB/FLO content.

In other configurations, a DVB/FLO content transfer channel may be determined based on (or in addition to) a predetermined list of preferences. For instance, given the example above, if first wireless unit 150 is in contact with receiving device 210 using the UWB channel, the Bluetooth channel and the 802.11 channel, the first wireless unit 150 may choose the Bluetooth channel should a list of preferences indicate some preference for the Bluetooth channel—or otherwise indicate that the UWB channel should never be used for receiving DVB/FLO content. Note that such a list of preferences for a particular receiving device 210, 220 or 230 may reside in either the first wireless unit 150 or in the respective receiving device 210, 220 or 230.

As DVB/FLO content is received by the first wireless unit 150 and forwarded to the receiving devices 210, 220 and 230, it should be appreciated that local conditions, such as proximity of the first wireless unit 150 relative to devices 210, 220 and 230, the availability of particular wired and wireless interfaces, multi-path problems, co-channel interference and noise, may affect the quality, e.g., the data transfer capacity, of each channel.

Accordingly, in various configurations, a wireless forwarding channel from the first wireless unit 150 to any of the receiving devices 210, 220 and 230 may be selected based, in whole or in part, on the data capacity of the various available channels. For example, again referring to FIG. 2, if the available UWB data transmission capacity is severely crippled due to external interference from the first wireless unit 150 to both receiving devices 210 and 220, and the Bluetooth data transmission capacity is limited to 10 Mbit/sec to receiving device 210 due to distance (i.e., low signal strength), then the first wireless unit 150 may select the 802.11 channel to forward DVB/FLO content to one or both of the receiving devices 210 and 220.

In addition to making an initial wireless channel selection for DVB/FLO content transfer, the first wireless unit 150 may, in a number of configurations, dynamically change wireless channels as circumstances change. For example, assuming that the first wireless unit 150 is transferring DVB/FLO content to receiving devices 210 and 220 using the 802.11 channel, and for whatever reason the quality or available data transfer capacity of the 802.11 channel degrades beyond a certain threshold, the first wireless unit 150 may reconfigure to use whatever remaining wireless channel apparently provides the best performance in some respect (e.g., best available data transfer capacity or lowest channel bit-error rate), or the wireless channel that otherwise provides some other advantage under some set of circumstances, such as circumstances that involve issues of resource allocation or where some set of metrics indicates that a wireless channel representing a particular compromise is necessary or desirable.

In addition to dynamic protocol handoff and use of multicasting, it should be appreciated that the first wireless unit 150 may use a wide variety of other optional processes to improve or optimize communication with receiving devices 210, 220 and 230. For example, the first wireless unit 150 may change between media formatting standards, such as MPEG-2, MPEG-4, ATSC and network abstraction layer (NAL) media standards, and/or use different levels of compression and/or different levels of "information loss" for a particular video standards, e.g., MPEG-2, that may use different amounts of information loss and possibly affect picture quality.

Still further, in a number of configurations the first wireless unit 150 may communicate with receiving devices 210, 220 and 230 using a variety of different error-coding schemes, including different types of inner-coding and outer-coding schemes, that may vary with various external conditions, such as the quality of a particular wireless channel.

Other aspects of the first wireless unit 150 that may be incorporated into various configurations include the capacity of the first wireless unit 150 to vary encryption and to provide session keys consistent with digital rights that may be associated with various streams of media. For example, the first wireless unit 150 may communicate with receiving devices 210, 220 and 230 using what is referred to below as "dynamic outer-coding" whereby the outer-coding of data transferred may be dynamically changed as a function of changing conditions. For example, it may be desirable in certain circumstances to increase the robustness of the outer-coding of a transmitted media stream should the signal-to-noise ratio of a wireless channel carrying the transmitted media stream rise, thus giving rise to an increased error rate of the wireless channel that the more robustness outer-coding may better address.

Additionally, the first wireless unit 150 may communicate with receiving devices 210, 220 and 230 using what is referred to below as "differential outer-coding" whereby the outer-coding of data transferred may be differentially changed as a function of data priority. That is, it may be desirable in certain circumstances to increase the robustness of the outer-coding for a select portion of a media stream relative to another portion. For instance, for a stream of video data it may be beneficial to use a 1/2 Reed-Solomon outer-coding scheme on MPEG I-Frames while using a 3/4 Reed-Solomon outer-coding scheme on MPEG P-Frames, or otherwise use more robust outer-coding schemes for color information relative to intensity information, or perhaps use more robust outer-coding schemes for video information that is spatially located in the center of a picture while using less robust outer-coding for video information that is spatially located in the edge of the same picture, or still otherwise use very robust levels of outer-coding based on packets containing very high-priority control information, such as information describing changes or sequences of various media-coding, error-coding or encryption.

Figure 3:
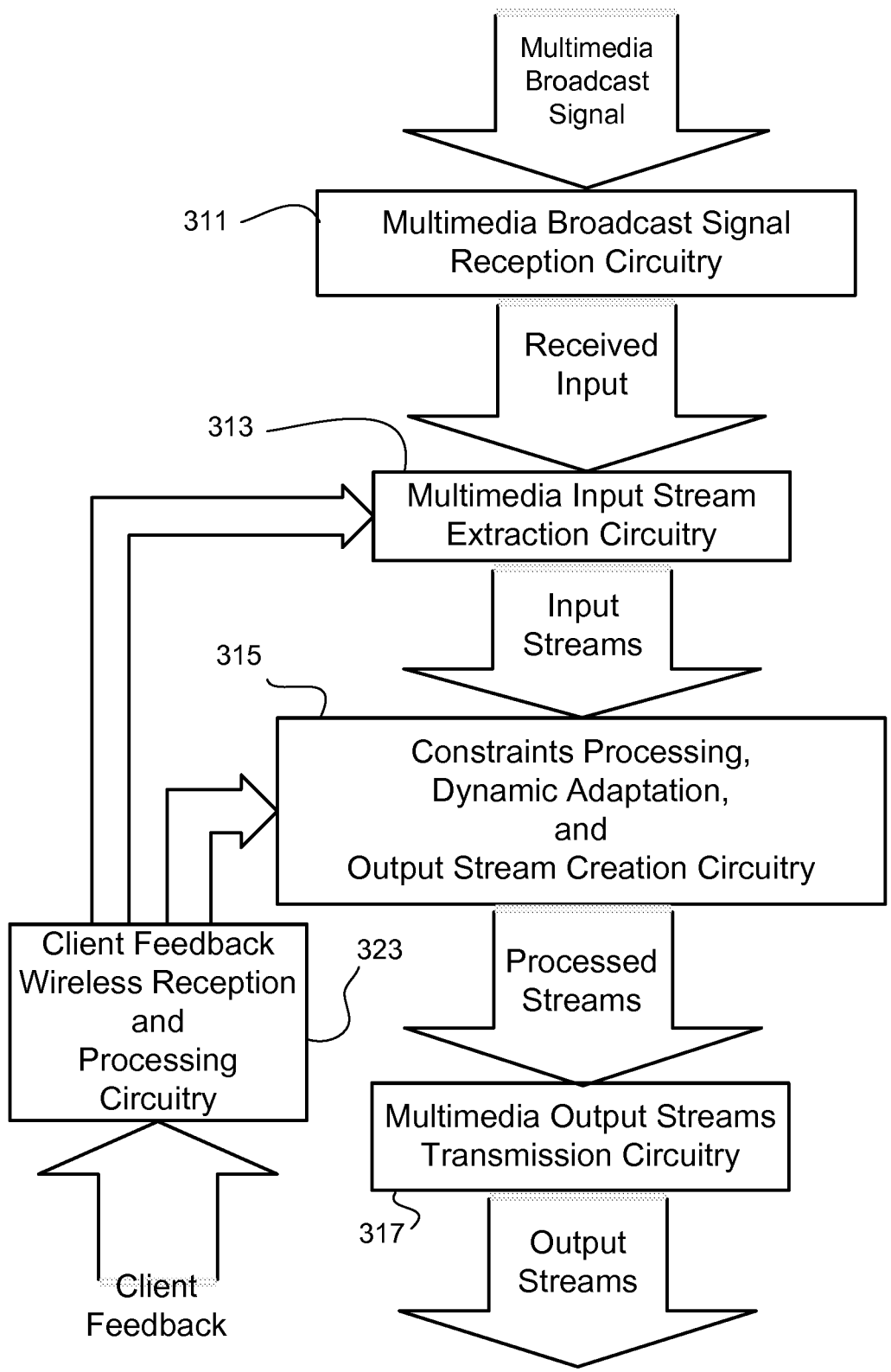
FIG. 3 is a diagram showing the top level operation of the multimedia broadcast and reception.

FIG. 3 is a diagram showing the top level operation of the multimedia broadcast and reception for dynamic stream output control. Depicted are multimedia broadcast signal reception circuitry module 311, multimedia input stream extraction circuitry module 313, constraints processing, dynamic adaptation and output stream creation circuitry module 315 and multimedia output stream transmission circuitry module 317. Also depicted is client feedback and wireless reception and processing module 323.

The technique provides for processing of input signal(s) and adjusting stream output according to feedback, processing capabilities, and so forth. The multimedia broadcast signal reception circuitry module 311 receives one or more multimedia broadcast signal streams. The multimedia input stream extraction circuitry module 313 is capable of extracting multiple multimedia input streams from the received input. The constraints processing, dynamic adaptation and output stream creation circuitry module 315 is capable of performing the constraints processing, dynamic adaptation and output stream creation on multiple input streams to provide multiple processed streams. The dynamic adaptation and output stream creation circuitry, multimedia output stream transmission circuitry module 317 is capable of receiving the processed streams from the constraints processing, dynamic adaptation and output stream creation circuitry module 315 and providing multiple output streams.

The client feedback and wireless reception and processing module 323 receives client feedback signals and is used to control the multimedia input stream extraction circuitry module 313 and constraints processing, dynamic adaptation and output stream creation circuitry module 315 for optimal or desired broadcast and reception of multimedia signal(s) in view of a particular deployment scenerio.

Based on the above paradigm for controlling stream output, flexibility in the type of stream output can be obtained in the manner discussed above with respect to FIGS. 1 and 2. For example, the output stream may be differently outer-coded based on channel conditions. As another example, different protocols may be applied to or used for different streams. In some instances, it may be desirable to provide pass-through capability in the various elements such that processing and/or adaptation may be performed by a downstream element or other device or circuit module that may have more resources available. Various aspects of the elements shown in FIG. 3 may be distributed between the broadcasting transmitter or the receiving client, according to design implementation. Examples of this are further described below.

Wireless Reception and Transmission Unit

Figure 4:
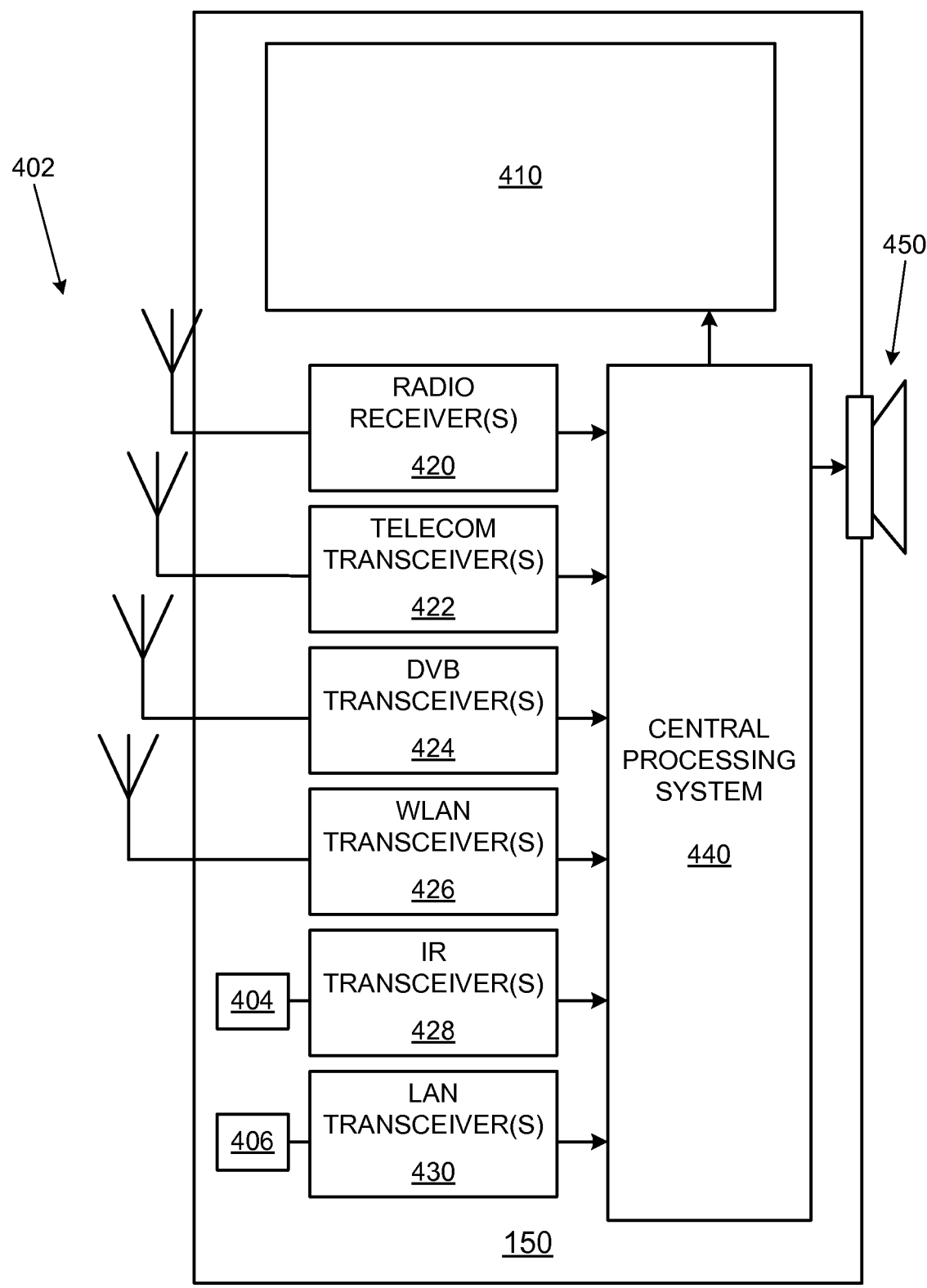
FIG. 4 shows details of the exemplary cellular telephone of FIG. 2.

FIG. 4 shows details of the exemplary first wireless unit 150 of FIG. 2. As shown in FIG. 4, the exemplary first wireless unit 150 includes a variety of input/output devices including a set of radio receivers 420, set of telecom (e.g., cellular) transceivers 422, a set of DVB transceivers 424, a set of wireless LAN (WLAN) (e.g., 802.11) transceivers 426, a set of infrared (IR) transceivers 428, and a set of wired (e.g., Ethernet and Firewire) LAN transceivers 430. The various input/output devices 420-430 can be serviced respectively by antennas 402, IR interface(s) 404 and electrical interface(s) 406. The exemplary first wireless unit 150 further includes a central processing system 440, a user interface display 410 and speaker(s) 450. While there may be other interfaces available to the exemplary first wireless unit 150, such as keypads, joysticks and the like, their presence is omitted from FIG. 4 for the sake of simplicity of explanation.

It should be noted that the elements described above, in connection with FIG. 4 can be provided as discrete modules or may be provided as a chipset including at least one monolithic integrated circuit.

Figure 5:
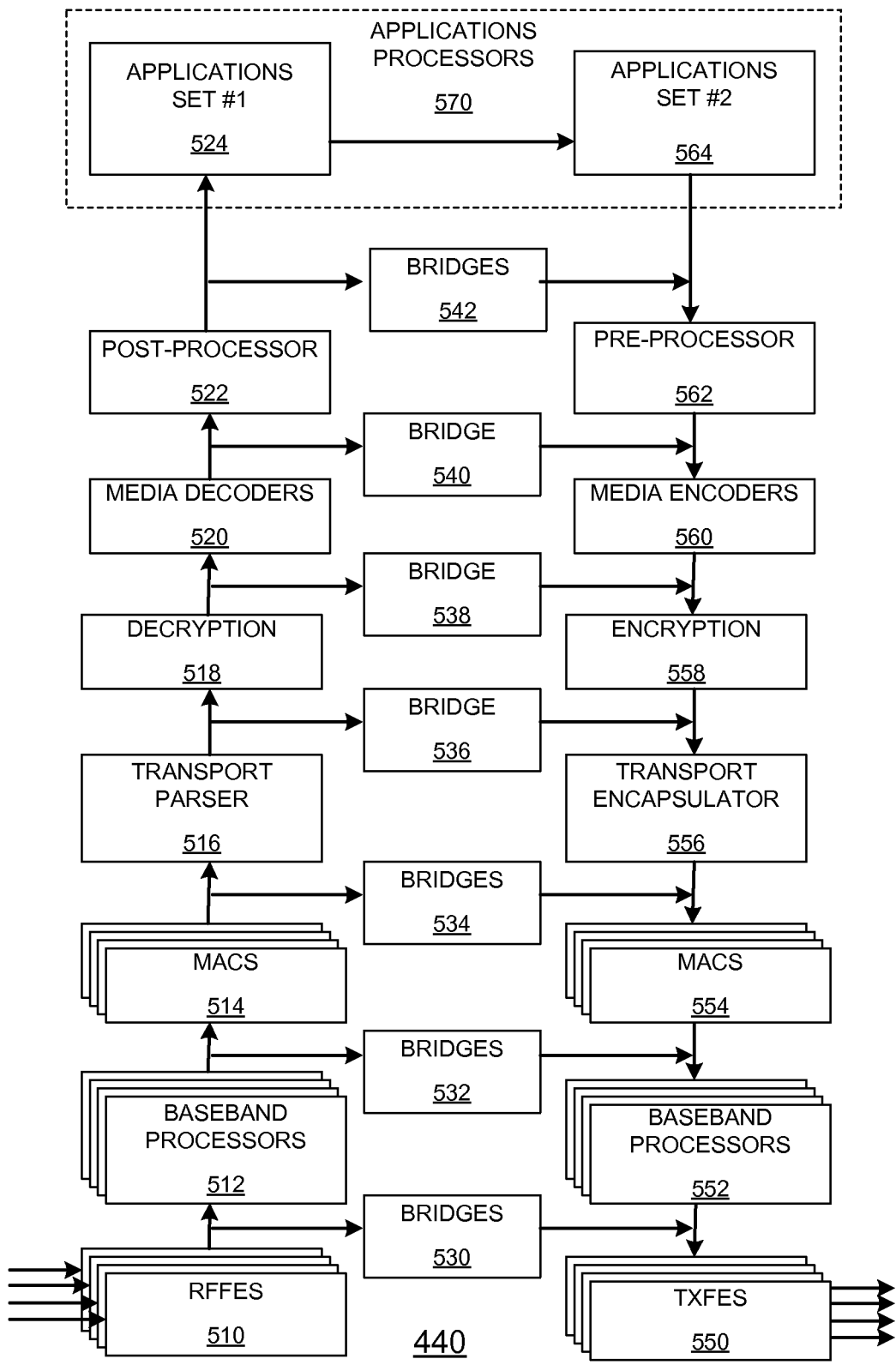
FIG. 5 shows details of the central processing system of FIG. 4.

FIG. 5 shows details of the exemplary central processing system 440 of FIG. 4. As shown in FIG. 5, the exemplary central processing system 440 includes a set of receiver RF Front ends (RFFE(S)) 510, a set of receiver baseband processors 512, a set of receiver Media Access Controllers (MACs) 514, a receiver transport parser 516, a decryption device 518, a set of media decoders 520, a post-processor 522 and a number of applications processors 570 containing a first set of applications 524 and a second set of applications 564. The exemplary central processing system 440 further includes a set of transmitter RF Front ends (TXFE(S)) 550, a set of transmitter baseband processors 552, a set of transmitter MACs 554, a transmitter transport encapsulator 556, an encryption device 558, a set of media encoders 560, a pre-processor 562, and a series of data bridges 530-542 providing optional data paths from various receiver devices 510-522 and transmitter devices 550-562. Note that the RFEE(s) 510 and TXFE(s) 550 may include portions of the radio receivers 420 and/or other transceivers 422-430 of FIG. 4. That is, while there may be redundancy between FIG. 4 and FIG. 5 with respect to the physical (PHY) layers of various wireless and wired communication channels, the inclusion of the RFEE(s) 510 and TXFE(s) 550 in FIG. 5 is made for clarity of explanation.

In various configurations, it should be appreciated that many of the devices, such as the transport parser 516, decryption device 518, media decoder 520 and post-processor 522, as well as their respective counterparts 556, 558, 560 and 562, may be either omitted in various configurations or be capable of being deactivated such that data passing through such devices may be unaffected. For example, in instances where non-encrypted data is received, it may be beneficial to disable the decryption device 518 such that data merely passes through unaffected. This permits the use of "pass-through" transmissions in which encryption is reduced or avoided.

Still further, in various configurations, it should be appreciated that many of the devices, such as the media decoder 520 and media encoder 560, may be integrated into a single device and/or realized using software. Accordingly, in such situations their connecting bridge 540 may take different forms, such as a software routine or interacting software routines.

Returning to FIG. 5, the various devices 510-570 may be used to provide a large variety of communication services, such as providing telephony services, sending and receiving text messages, receiving and playing FM, AM and satellite radio, providing LAN services and providing DVB/FLO services. While explanation of the central processing system 440 will be limited primarily to DVB/FLO functionality, it should be appreciated to those of ordinary skill in the art that the various devices 510-570 may integrate any known or later develop functionality as may relate to cellular telephony, LANs and DVB/FLO services.

In operation, the RFFE(S) 510 may receive any number of wireless signals containing media content, and perform a number of PHY related operations on the received wireless signals, including filtering, amplification and frequency translation to baseband level, to produce a number of first receiver output(s). The first receiver output(s), in turn, may be directed to one or both of the set of receiver baseband processor(s) 512 and the set of TXFE(s) via bridge 530.

When the first receiver output(s) are sent to the set of TXFE(s) 550 via bridge 530, the set of TXFE(s) 550 may be used to re-transmit the first receiver output without requiring any substantial processing of the various upper-layer devices 512-522, 552-564 and 570. For example, by using bridge 530, the first wireless unit 150 could receive a DVB signal over television channel 53 and re-transmit the content of the DVB signal locally over television channel 56 without using anything more than a few commands at the applications layer to set the operational parameters of the RFFE(S) 510, bridge 530 and the TXFE(s) 550.

Continuing, the receiving baseband processor(s) 512 can demodulate the first receiver output(s) to produce a number of symbol or bit streams, and in various circumstances be configured to perform various error-correction processes, such as perform an inner-coding error correction on the symbol/bit streams to produce one or more second receiver output(s). The second receiver output(s), in turn, may be directed to one or both of the set of receiving MAC(s) 514 and the set of transmitter baseband processors via bridge 532.

When any of the second receiver output(s) are sent to the transmitter baseband processors via bridge 532, the transmitter baseband processors may be used to re-transmit the second receiver output(s) without requiring any substantial processing of the various upper-layer devices 514-522, 554-564 and 570, but enable some greater amount of flexibility is gained as compared to instances where bridge 530 is used. For example, by using bridge 532, the first wireless unit 150 could receive a DVB/FLO signal over television channel 53 and re-transmit the content of the DVB/FLO signal over another frequency, using another modulation technique and/or using a different inner-coding scheme or no inner-coding scheme at all.

It is possible to provide for retransmissions and to control how the retransmission of packets is achieved, provided that the protocol permits retransmissions. Most wireless protocols provide support for retransmissions at the MAC-layer (re-transmit the same packet using the same modulation coding scheme as the previous failed attempt, or a more robust modulation and coding scheme, or using hybrid-ARQ to send additional information). If there is a failure to transmit, for example up to a retransmission limit, then transmission of a MAC-packet-data-unit is aborted, and the MAC attempts the next PDU for transmission. While retransmissions are implicitly supported in the wireless MAC implementations, according to the present techniques, it is possible to dynamically control how modulation and coding schemes are changed and how many retransmissions to attempt. The specific constraints for retransmission are a matter of design choice, and if the wireless MAC drivers allow such control. Additionally if a reliable protocol such as TCP is used to forward IP packets, then TCP attempts its own retransmissions if IP packets fail to get transmitted between the two devices, meaning that if the MAC fails, then TCP can help.

Continuing, the receiving MAC(s) 514 can receive the second receiver output(s), and perform a number of processes traditionally associated with MACs, such as providing outer-coding error-detection and correction, determining whether each packet is successfully received, providing logical addressing, and monitoring various aspects of data channels, such as identifying which wireless protocols/channels are available, identifying which wireless protocols/channels are in use, identifying the available bandwidth of each channel, identifying the signal strength of each channel, identifying the bit error-rate and/or packet error-rate, identifying the average and/or maximum back-off times, identifying channel latency and identifying the average and/or the maximum number of retransmissions for a channel. The exemplary MAC(s) 514 can also provide a number of conventional and novel outer-decoding and de-interleaving operations as may be found advantageous as will be further explained below.

As the receiving MAC(s) 514 perform their assigned tasks, the MAC(s) 514 can provide one or more resulting third receiver output(s) to the receiving transport parser 516 and/or to the transmit MAC(s) 554 via bridge 534.

When any of the third receiver outputs are sent to the to the transmit MAC(s) 554 via bridge 534, the central processing system 440 may be used to re-transmit some or all of the content of the third receiver output, but again with some amount of greater flexibility as compared to instances where bridge 532 is used. For example, by using bridge 534, the central processing system 440 could receive a DVB signal over television channel 53 and re-transmit the content of the DVB signal over another frequency while reassigning logical addresses, using a different outer-coding scheme, retransmit using a completely different wireless protocol, retransmit to multiple receiving devices, and so on as may be readily recognized by those of ordinary skill in the art.

Continuing, the receiving transport parser 516 (or "transport packet parser 516") can receive the third receiver output(s), and perform a number of processes traditionally associated with transport parsers, such as separating various media streams from one another into various individual media streams, identifying various control information and flags about individual media streams (such as titles, types of encryption used, types of media-coding used, and date/time stamps) discarding content not in use, appropriately routing content that may be in use, check for continuity of various media streams and so on, to produce a one or more fourth receiver output(s). The various fourth receiver output(s), in turn, may be directed to one or both of the decryption device 518 and the transport encapsulator 556 via bridge 536.

When one or more fourth receiver output(s) are sent to the transport encapsulator 556 via bridge 536, the central processing system 440 can retransmit sub-portions of the originally received DVB/FLO content or mixes of the received DVB/FLO content and other content. For example, by using bridge 536, the central processing system 440 could receive a DVB/FLO signal over a highly data-intensive OFDM channel, then form a substantially lower data-intensive media stream that may be readily transmitted to a receiving device via a relatively low data-intensive channel while requiring little or no processing at the applications layer.

Continuing, the receiving decryption devices 518 can receive any or all of the fourth receiver outputs, and appropriately decrypt them (if necessary) according to any known or later developed encryption/decryption scheme and/or according to any standard of media rights and use of session keys. Decrypted media streams (or those media streams merely passing through unaffected) may then be forwarded to the media decoder(s) 520 and/or to the encryption device 558 via bridge 538.

When any of the various streams of decrypted media are sent to the encryption device 558 via bridge 538, the central processing system 440 can retransmit all or portions of the originally received DVB/FLO content, or mixes of DVB/FLO content and other content, using different encryption schemes. Additionally, new time stamps and and/or session keys may be generated such that the central processing system 440 may retransmit and monitor/manage media content consistent with any number of digital rights agreements. For example, a cellular telephone incorporating the central processing system 440 may opt out of directly displaying a movie received via a DVB signal in favor of displaying the movie on a larger screen embedded in a portable computer. Accordingly, the stream of media containing the movie of interest may be parsed by the transport parser 516, decrypted by decryption device 518, re-encrypted using encryption device 558 (again, according to a protocol consistent with the digital media rights associated with the movie) and retransmitted to the personal computer, where the personal computer may, using the appropriate session key provided by the central processing system 440, decrypt and play the movie noting that, should the viewer wish to pause the movie for some time, some form of adjustment of the movie's time stamps may be necessary.

Continuing, the media decoder(s) 520 can receive any number of media streams from the decryption device 518, and apply the appropriate media decoding operations, if necessary, to produce a one or more raw media output(s). The raw media output(s), in turn, may be directed to one or both of the set of post-processor(s) 522 and the set of encoders 560 via bridge 540.

When any of the raw media outputs are sent to the set of encoders 560 via bridge 540, the central processing system 440 may be used to re-transmit the some or all of the content of the raw media, but again with some amount of greater flexibility as a resultant transmitted output media stream may be produced to include received DVB/FLO content utilizing completely different audio-visual coding. For example, a received MPEG-2 movie having no information loss may be received and reformatted to another MPEG-2 stream having some information loss and a corresponding lower data transmission overhead with little processing required at the higher applications levels.

Continuing, the post-processor 522 can receive any number of raw media streams from the media decoder(s) 520, and appropriately apply any amount of post-processing (if necessary) according to any known or later developed processing scheme to convert raw media data into "reformatted media data." For example, post-processor 522 may receive a raw media data stream from the decoder(s) 520, then perform spatial image enhancement and increase the frame rate on the video portion of the raw media data while effectively changing the audio sampling rate from a few thousand samples-per-second to over a million samples-per-second for the benefit of a delta-sigma digital-to-analog converter. Any output of the post-processor 522 may be fed to the applications processor(s) 570 and/or provided to the pre-processor 562 via bridge 542.

When any of the post-processor's outputs are sent to the pre-processor 562 via bridge 542, the central processing system 440 may be used to re-transmit the some or all of the content of the post-processor's enhanced outputs, which can enable the processing system 440 to provide DVB/FLO content to external devices having various enhancements.

Continuing, the applications processors 570 can receive any number of media streams from the post-processor 522 to either route such data to the appropriate audio device and/or video display, or possibly provide further processing, such as provide text-to-speech or speech-to-text transformations, and so on.

The applications processors 570 may also be used to receive various commands, information and flags encapsulated within the received DVB/FLO content, as well as produce various commands, information and flags that may be embedded/encapsulated in any outgoing media stream via the transport encapsulator 556. Still further, the applications processors 570 may provide those parameters, directly or indirectly, necessary to configure the various devices 510-522, 530-542 and 550-562 under their control. For example, the applications processors 570 may be able to change inner-coding at the transmitter baseband processor(s) 552 and outer-coding at the transmitter MAC(s) 554 either by some form of direct command or indirectly via commands/flags/information that may be passed down layer by layer.

Command Processor

Figure 6:
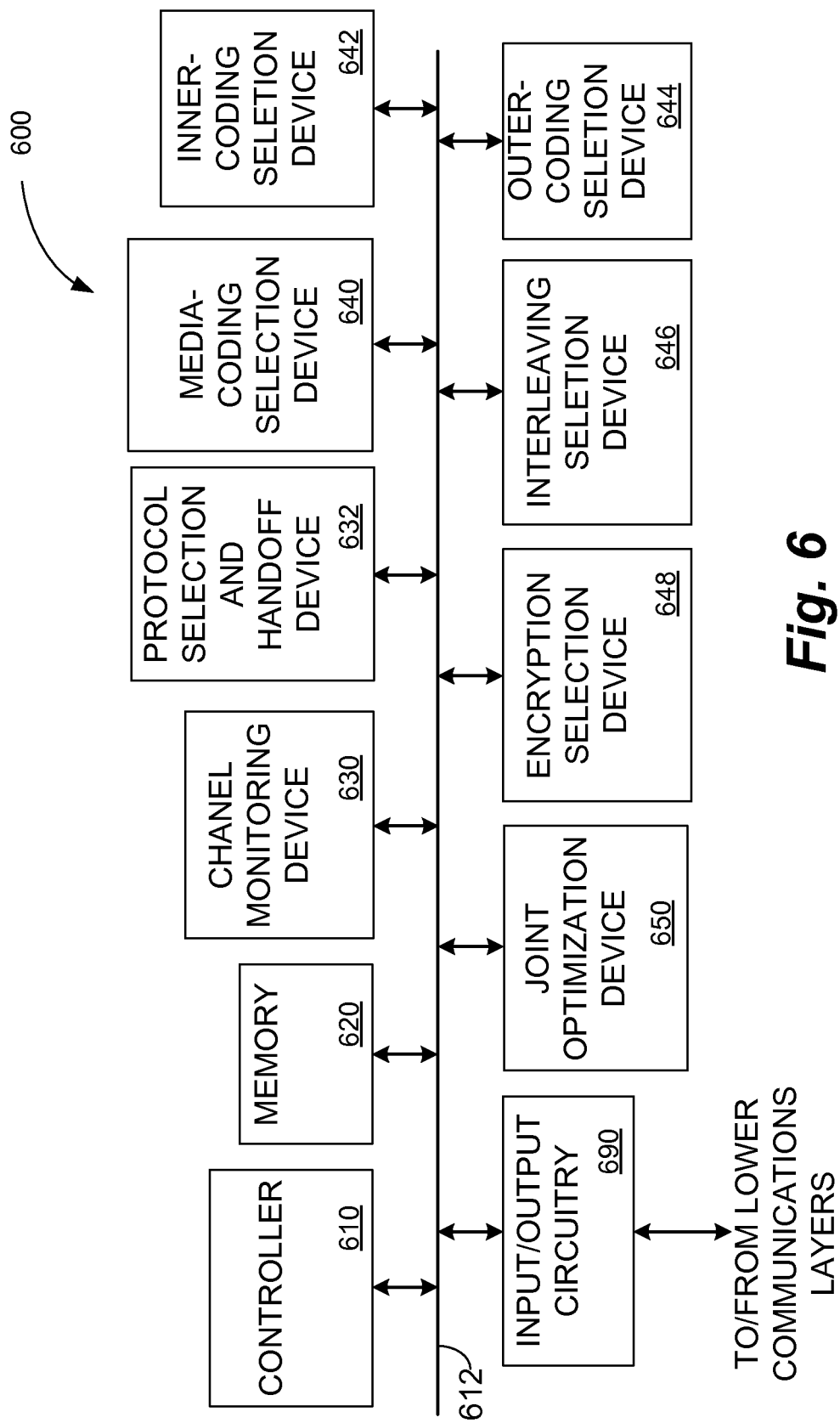
FIG. 6 shows further details of the central processing system of FIG. 4.

FIG. 6 depicts a command processor 600 used for controlling communications. As shown in FIG. 6, the exemplary command processor 600 includes a controller 610 connected through data bus 612 to memory 620, channel monitoring device 630, protocol selection and handoff device 632, media-coding selection device 640, inner-coding selection device 642, outer-coding selection device 644, interleaving selection device 646, encryption selection device 648, joint optimization device 650 and input/output circuitry 690.

Although the exemplary command processor 600 of FIG. 6 uses a bussed architecture (represented by data bus 612), it should be appreciated that any other architecture may be used as is well known to those of ordinary skill in the art. For example, in various configurations, the various components 610-690 can take the form of separate electronic components coupled together via a series of separate busses.

In other configurations, one or more of the various components 610-690 can take form of separate processing systems coupled together via one or more networks. Additionally, it should be appreciated that each of components 610-690 advantageously can be realized using multiple computing devices employed in a cooperative fashion.

It also should be appreciated that some of the above-listed components 610-690 can take the form of software/firmware routines residing in memory 620 and be capable of being executed by the controller 610, or even software/firmware routines residing in separate memories in separate computing systems being executed by different controllers. For example, in various configurations it may be advantageous to put the outer-coding selection device 644 and interleaving selection device 646 in a MAC, while placing the inner-coding selection device 642 in a PHY noting that they may be made to work independently or enabled to perform some joint optimization assuming some special communication routes are established.

Further, it should be understood that the functions of any or all of components 630-690 may be accomplished using object-oriented software, thus increasing portability, software stability and a host of other advantages not available with non-object-oriented software. These elements described in connection with FIG. 6 can be provided as discrete modules or may be provided as a chipset including at least one monolithic integrated circuit.

In operation, the channel monitoring device 630 can receive a variety of information regarding the existence and status of any number of wired or wireless communication channels subject to control by, or otherwise associated with, the command processor 600. In various configurations, the information in the channel monitoring device 630 may be provided by a multi-radio database or otherwise provided in a more conventional manner, e.g., passed layer-by-layer from the various MACs. For example, referring to FIG. 2, the channel monitoring device 630 may be populated with information regarding the UWB, Bluetooth and 802.11 devices embedded in the first wireless unit 150 as well as any prospective wireless channels established or otherwise available to the various receiving devices 210, 220 and 230.

The protocol selection and handoff device 632 may be used to select and establish wireless communication channels from the appropriate transmitter circuitry (e.g., TXFEs 550 of FIG. 5) to the desired receiving device(s). In various configurations, such selections and supporting computations may use the information residing in the channel monitoring device 630, and in various configurations the protocol selection and handoff device 632 may be configured to control a wide variety of hardware, such as any of the devices 510-562 of FIG. 5. For example, the protocol selection and handoff device 632 may be used to control the TXFE(s) 550, the transmitter baseband processors 552 and the transmitter MACs 554 to steer a particular multimedia stream to a distant receiving device using an 802.11 protocol.

Continuing, the media-coding selection device 640 may be used to select the media-coding format/scheme upon which multimedia is delivered to a distant receiving device. For example, assuming that a DVB/FLO content channel was available and the video content of the DVB/FLO content channel was formatted using a network abstraction layer (NAL) media format/scheme, then the media-coding selection device 640 might use the indigenous NAL scheme to forward a video stream to a distant receiving device, make adjustments within the NAL standard protocol to forward the video stream, or otherwise select an entirely different standard, such as the MPEG-2 standard, the WMV (Windows Media Video) standard, and ASF (Advanced Systems Format) standard, the ATSC (advanced television) standard, any of the Real Media standards (e.g., RM, RMVB, RAM and RA), the AVI standard, the MP4 standard, the MOV standard, the 3GP standard, the MP3 standard or any other known or later developed video format/scheme as may be found advantageous.

In various configurations, the particular media-coding scheme used may be dependent on limitations of a targeted receiving device. For example, the targeted receiving device may be directly limited as to the number of video formats for which it contains supporting hardware or software, or may otherwise be indirectly limited to those media-coding schemes that require minimal processing due to processor limitations at the targeted receiving device.

Still further, the type of media-coding selected may be determined (in whole or in part) based upon the physical characteristics of a display screen (e.g., limitations as to spatial resolution, color resolution and/or light intensity resolution) or whether the receiving device has notable limitations as to its audio capacity, e.g., has only a single, low-quality speaker. For example, assuming that a display associated with a targeted receiving device has only a spatial resolution of 160-by 320 pixels, the media-coding selection device 640 may provide instructions and control information to a media encoder under its control to cause the media encoder to provide no more resolution that the targeted display may possible use. Still further, the media-coding selection device 640 may choose the level of information loss depending on the nature of the targeted receiving device and its display.

Still further, the type of media-coding used may be limited to the processing overhead of the various devices under control of the exemplary command processor 600. For example, assuming that a majority of functions are limited to the software processing power of two embedded processors for a total of 200 Million operations per second, then the total processing for media-coding may be limited to this processing cap, plus whatever overhead may be required by other applications, by encryption and error-coding requirements, and so on.

In addition to characteristics of a receiving device, the particular media-coding scheme used may be dependent on a number of other relevant factors, such as the wireless communication standard used between the transmitting circuitry under control of the command processor 600 and the targeted receiving device(s), a data transfer capacity of a wireless channel between the transmitting circuitry and the targeted receiving device(s), a transmission bit-error rate of the wireless channel from the transmitting circuitry to the receiving device(s), or any other aspect of a communication channel that may affect performance.

In view of the available effective data transfer capacity of a wireless channel, the media-coding scheme may be tailored based on the data transfer overhead of the media-coded stream of data. For example, assuming that a particular wireless channel is limited to ~10 Mbit/sec, then it would be impractical to use a media-coding scheme that would require more than ~10 Mbit/sec to deliver the resultant media stream.

Further, considering the data transfer overhead associated with various communications channels, such as packet headers and error-coding overhead, the appropriate media-coding scheme may be further limited. For example, assuming that a 1/2 convolutional inner-coding and a 1/2 Reed-Solomon block outer-coding were selected for use with the media-coded stream of data due to a onerous bit-error rate of the available wireless channel, then the selected media-coding scheme may likely be no more than 2 Mbits/sec.

Given that the characteristics of wireless channels are susceptible to change, the exemplary media-coding selection device 640 may be configured to account for such changes in such a way as to allow graceful degradation or enhancement of media quality at the receiving apparatus. For example, assuming that the ~10 Mbit/sec communication channel mentioned above degrades to ~8 Mbit/sec, then it could be beneficial for the media-coding selection device 640 to adopt a media-coding scheme that used less data, either by adopting another media-coding standard or by adapting the presently used media-coding standard to increase its information loss.

Accordingly, while media quality might degrade, the receiving device would nonetheless still have a video signal for the user of a receiving device to enjoy.

It should be appreciated that there may be instances where a communications channel degrades beyond some threshold so as to make changing a presently used wireless channel to another wireless channel beneficial or necessary. In various instances, the change of wireless channel may be within a given wireless protocol (e.g., changing from 802.11 channel 2 to 802.11 channel 4) or a change to another protocol (e.g., changing from 802.11 to Bluetooth). In such instances, it may be beneficial or necessary to change media-coding for any of a number of reasons, such as the resultant change in data transfer capacity and/or the resultant change data transfer overhead, some aspect of the PHY or MAC layers supporting the different wireless protocols and so on.

In addition to the ability of the exemplary media-coding selection device 640 to dynamically select media-coding based on changing conditions, in various configurations the exemplary media-coding selection device 640 may be enabled to apply "differential media-coding." That is, it may be beneficial for the exemplary media-coding selection device 640 to apply different media-coding to different portions of the first stream of data.

For example, assuming that an NAL media-coding standard is used, it may be beneficial for the media-coding selection device 640 to cause a media-coding device to apply a first NAL coding with no information loss for areas in the middle of a display while applying a second NAL coding having substantial information loss for areas at the perimeter of the same display.

Similarly, information loss may be divided based on type of frame or slice, as opposed to the spatial location of the relevant information. For example, assuming that an MPEG-2 media-coding standard is used, it may be beneficial for the media-coding selection device 640 to cause a media-coding device to apply a first (non-lossy) MPEG-2 coding for I-frames, but apply a second (lossy) MPEG-2 coding to P-frames.

In view of the various complexities of communications channels and those benefits that may be derived by providing the best possible media quality to a receiving device, it may be beneficial in various configurations for the media-coding selection device 640 to select media-coding as a function of PHY and MAC layer considerations. For example, in instances where inner-coding may need to be increased, it may be beneficial for the media-coding selection device 640 to select a media-coding scheme that uses less data transfer overhead in lieu of the increased data transfer overhead used by the enhanced inner-coding. Similarly, in instances where outer-coding may decrease without detriment, it may be feasible for the media-coding selection device 640 to select a media-coding scheme that uses greater data transfer overhead that might otherwise be wasted.

Accordingly, in various configurations, the selections of the media-coding selection device 640, as well as the selections of the remaining devices 642, 644, 646 and 648, may be subject to some form of joint optimization provided by the exemplary joint optimization device 650. Generally, it may be feasible for joint optimization to take into account any combination of media-coding, error-coding, data compression, communication channel protocol and other relevant considerations. Thus, in various configurations, the exemplary joint optimization device 650 may be made to operate according to any number of parametric equations, statistical analysis or other form of processing that may lead to a substantially maximum percentage of successfully transmitted data bits to a receiving apparatus, substantially maximum percentage of successfully transmitted video frames to a receiving apparatus or otherwise provide substantial improvement in media quality at a receiving apparatus. For example, the joint optimization device 650 may use an N-dimensional table with entries developed via simulation and experience, such that ranges of input parameters, such as channel data capacity, data transfer overhead capacity and signal-to-noise ratios, may produce a set of outputs, such as optimal media-coding, inner-coding, outer-coding and compression, that may be employed to forward media content.

Outer Coding

Returning to FIG. 6, the inner-coding selection device 642, which may be made to control the actual inner-coding processes at the PHY level, can be used to enable joint optimization of error-coding under a particular set of data transfer conditions and in lieu of other coding issues, as well as enable advantageous dynamic inner-coding and possibly differential inner-coding (assuming that convolutional coding is not used).

Continuing, the outer-coding selection device 644, which may be made to control the outer-coding processes at the MAC level, can also be used to enable joint optimization of error-coding under a particular set of data transfer conditions and in lieu of other issues, as well as enable advantageous dynamic and differential outer-coding. For example, while some form of outer-coding circuitry that performs the actual outer-coding processing for an outgoing stream of data may reside at the MAC layer of a communications system, the outer-coding selection device 644 can be made to control that circuitry to produce new and advantageous forms of outer-coding, such as the dynamic and differential outer-coding discussed above.

It should be appreciated that, while it may be possible to always re-transmit packets that were unsuccessfully received by the receiving apparatus, possibly while using a more robust outer-coding scheme, for the present circumstances the terms "dynamic outer-coding" and "differential outer-coding" do not include that particular concept of communication. That is not to say, however, that systems and methods employing dynamic outer-coding and differential outer-coding may not be combined with some form of retransmission or systems employing some form of re-transmission cannot separately employ dynamic outer-coding and/or differential outer-coding.

Generally, the outer-coding selection device 644 may cause changes in outer-coding based upon a variety of changing circumstances related to the transmission channel used, such as an associated bit-error rate or packet-error rate, other aspects of channel quality, the amount of transmission overhead caused by inner-coding, the available data-transmission bandwidth of the communications channel and the amount of resultant transmission overhead required by the particular outer-coding scheme used, and again the outer-coding may be based on a joint-optimization.

For example, assuming that the outer-coding selection device 644 can access the channel monitoring device 630, the outer-coding selection device 644 may select a more robust level of outer-coding based on an increased transmission packet-error rate of the relevant transmission channel taking into account the increased outer-coding robustness, the increased resulting processing and transmission overhead, and other limitations of the relevant transmission channel to possibly improve or generally optimize media quality at the receiving apparatus.

Such forms of optimization may take the form of optimizing the total number of packets successfully received by a receiving device, the total number of video frames or slices successfully received, the total number of a particular type of video frame (e.g., MPEG I-Frames) or slice (e.g., some form of H.264, slice data) successfully received, or any other aspect upon which media may be optimized, including optimization determined by subjective studies.

Note that in various configurations and/or circumstances, dynamic changes in outer-coding may be made within a specific protocol/standard. For example, dynamic outer-coding increases may be made within the Reed-Solomon (RS) protocol/standard from 1/4 RS to 5/16 RS to 3/8 RS to 1/2 RS and so on as a signal quality of the relevant channel slowly degrades.

Similarly, dynamic changes in outer-coding may be made between protocols/standards. For example, the outer-coding selection device 644 may change the selected/implemented outer-coding from Reed-Solomon to Bose-Ray-Chaudhuri-Hocquenghem (BCH) coding, i.e., to another block error-coding scheme, or perhaps cause a change between block error-coding and convolutional error-coding having the same or different coding rates.

Continuing, it should be appreciated that there may be circumstances where a particular stream of media may be divided into two or more separate streams with each stream transmitted over a different wireless channel with any or all of such transmitted streams using different types or rates of outer-coding, as well as be controlled by the outer-coding selection device 644 to use separate dynamic outer-coding sequences. Such separate dynamic outer-coding sequences may be independent of one another or part of some form of joint optimization.

In certain configurations where a media stream is divided to multiple media sub-streams, the separate media sub-streams may be divided into "layers", including a "base-layer" and one or more "enhancement-layers." Generally, a base-layer may contain some amount of media information deemed to include some minimal (or otherwise suitable) amount of information useful for some level of consumer enjoyment, while enhancement-layers may contain additional media information that can, when combined with the information of the base-layer, improve the quality of media.

Generally, it may be advantageous to apply a more robust error-coding to communication channels carrying base-layers than enhancement-layers, generally due to issues such as signal-to-noise scalability, frame rate, spatial resolution, color-resolution and intensity resolution. Despite this, in various configurations and circumstances, the amount of outer-coding for a base-layer channel may be less than that for an enhancement-layer if the channel-quality for the base-layer channel is substantially better than that for the respective enhancement-layer(s) as the overall reliability/quality and/or available data throughput of the base-layer channel more than compensates.

As mentioned above, in addition to dynamic outer-coding the outer-coding selection device 644 may act to create differentially outer-coded streams of data. Generally, as with dynamic outer-coding, the outer-coding selection device 644 may make its selections based on a variety of information, including that information used for dynamic outer-coding, and derive control information for which it might control the outer-coding processes of a MAC or other device responsible for such error-coding. Further, it should be appreciated that differential outer-coding may be applied to most situations that dynamic outer-coding is applied. For example, the base-layer and enhancement-layer channels mentioned above may employ differential outer-coding in a wide variety of configurations.

In order to perform some form of advantageous differential outer-coding, the outer-coding selection device 644 may act as a "prioritizing device" in that it may assign different portions of the outgoing data stream with different priority levels. Based on such prioritization, an appropriate error-coding device, such as one of the transmitter MAC(s) 554 of FIG. 5 may apply the appropriate outer-coding to the outgoing data stream.

Again returning to FIG. 6, it should be appreciated that the outer-coding selection device 644 may be used to apply hybrid dynamic and differential outer-coding. For example, for a stream of data having portions assigned high, medium and low priority data that are assigned 1/2 RS, 9/16 RS and 3/4 RS outer-coding respectively, the outer-coding selection device 644 may re-select outer-coding rates of 3/8 RS, 1/2 RS and 9/16 RS in response to increased channel noise.

Still further, the outer-coding circuitry may be made to dynamically change the outer-coding scheme for sub-portions of the first stream of data independent or dependent of the outer-coding scheme of other sub-portions of the first stream of data. For example, using the example immediately above, in response to increased channel noise outer-coding may be change from 1/2 RS, 9/16 RS and 3/4 RS outer-coding to 1/4 RS, 9/16 RS and 3/4 RS respectively.

Continuing to the interleaving selection device 646, it may be appreciated that interleaving could occur before and/or after outer-coding for different purposes. If applied before, it could be used to randomize burst errors in a way that the application layer can handle these errors better. If applied after, it may provide more time diversity (or frequency diversity depending on time-frequency mapping) during deep fades in the channel. Generally, the latter form is more widely used in practice.

Note, however, that in order to preserve differential outer-coding, the interleaving selection device 646 may, depending on the particular circumstances, need to control the appropriate interleaving circuitry (typically associated with a MAC) to contain interleaving within individual packets or groups of packets of a particular outer-coding type or strength/robustness. That is, interleaving may be limited to the boundaries of outer-coding changes.

Receiving Device and CPU

Figure 7:
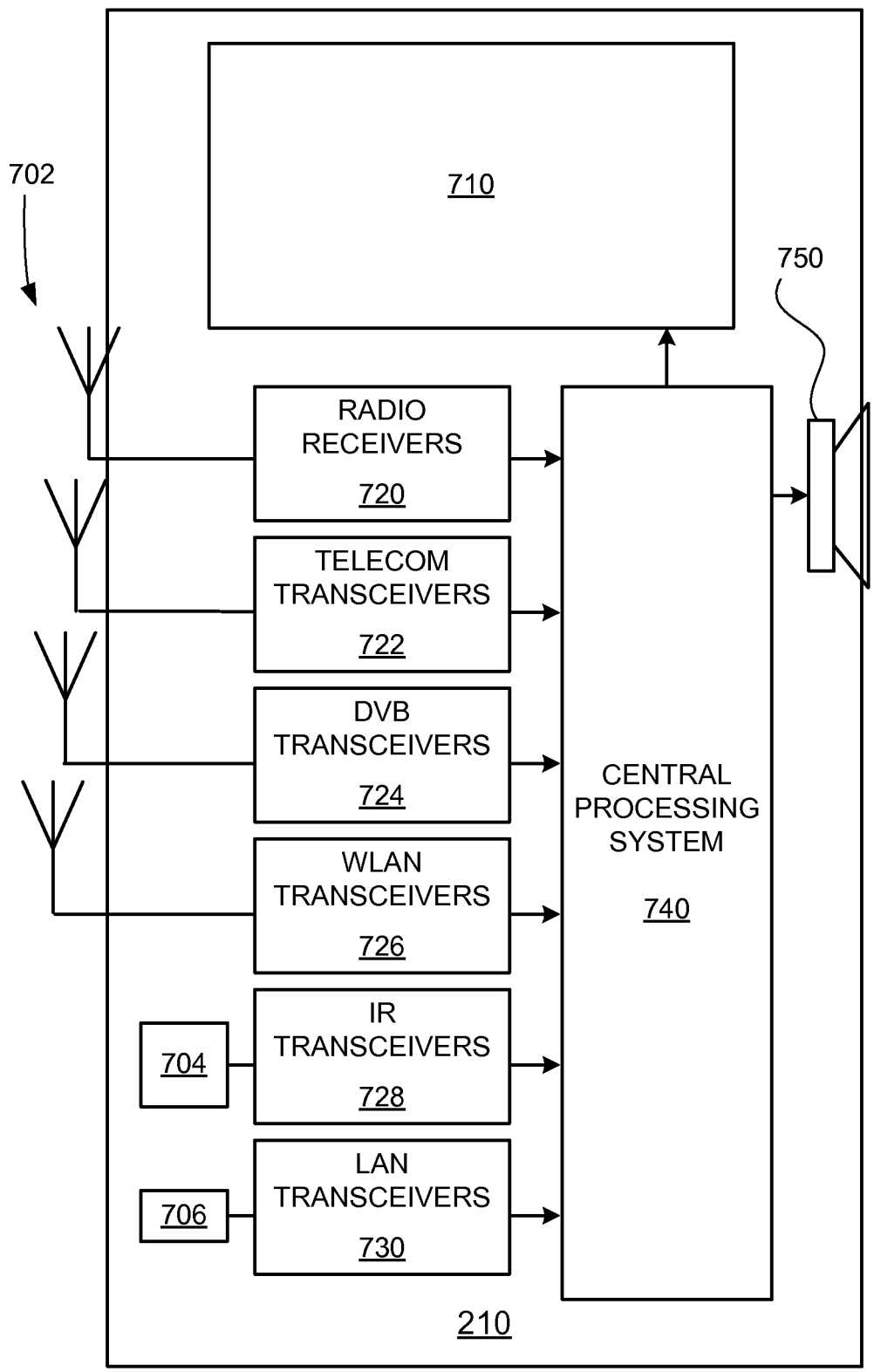
FIG. 7 shows details of the exemplary receiving device of FIG. 2.

FIG. 7 shows details of an exemplary receiving device 210 of FIG. 2. As shown in FIG. 7, the exemplary receiving device 210 includes a variety of input/output devices including a set of radio receivers 720, set of telecom transceivers 722, a set of DVB transceivers 724, a set of WLAN transceivers 726, a set of infrared (IR) transceivers 728, and a set of wired LAN transceivers 730. The various input/output devices 720-730 are serviced respectively by antennas 702, IR interface(s) 704 and electrical interface(s) 706. As with the exemplary first wireless unit 150 of FIG. 4, the exemplary receiving device 210 further includes a central processing system 740, a user interface display 710 and speaker(s) 750, and in various configurations, the various components 702-740 may individually work in manners similar to their counterparts 402-440 of FIG. 4.

Figure 8:
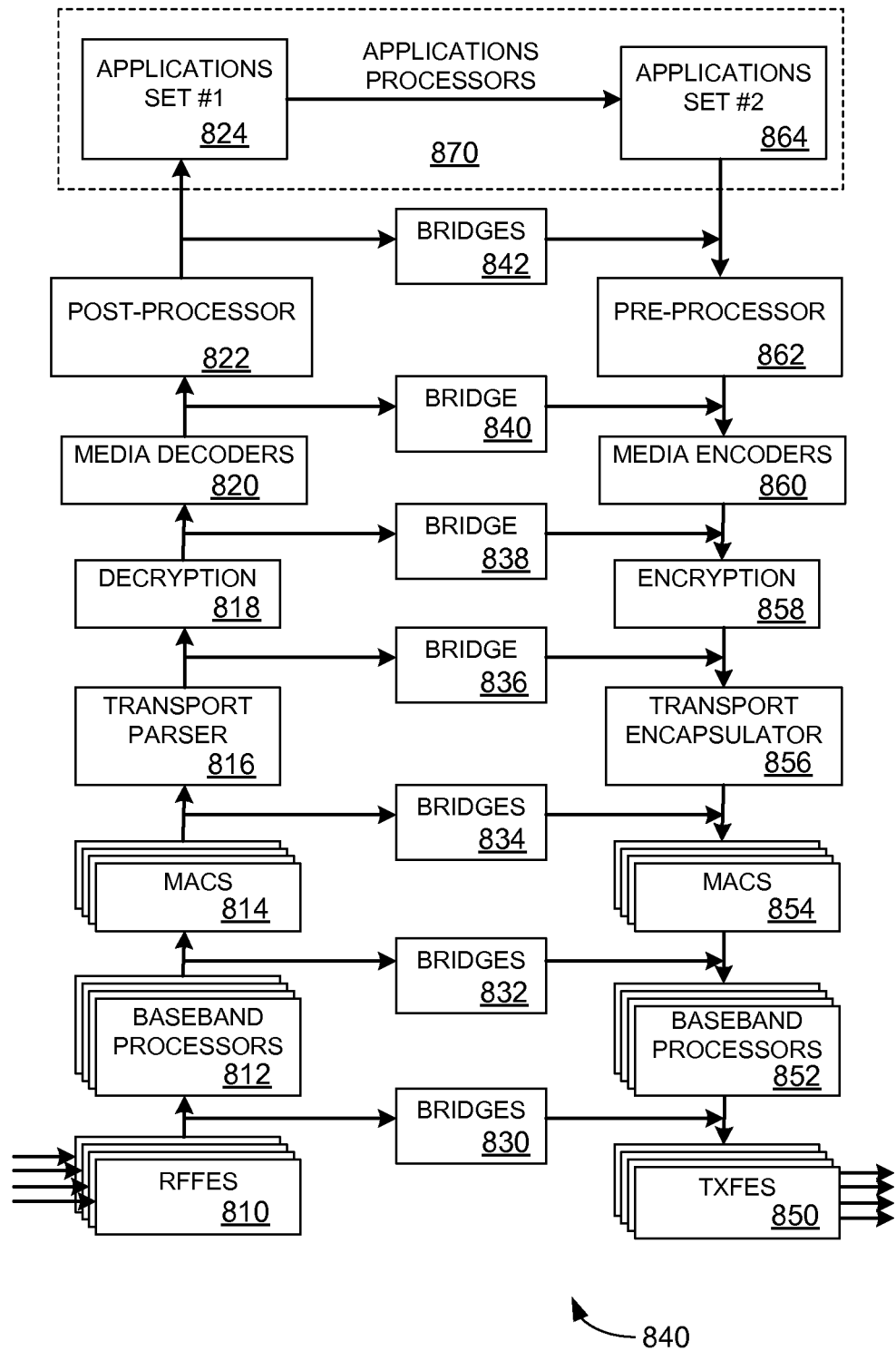
FIG. 8 shows details of the central processing system of FIG. 7.

FIG. 8 shows details of the central processing system 740 of FIG. 7. As with the central processing system 440 of FIG. 5, the instant central processing system 740 includes a set of RFFE(S) 810, a set of receiver baseband processors 812, a set of receiver Media Access Controllers (MACs) 814, a receiver transport parser 816, a decryption device 818, a set of media decoders 820, a post-processor 822 and a number of applications processors 870 containing a first set of applications 824 and a second set of applications 864. The exemplary central processing system 440 further includes a set of TXFE(S) 850, a set of transmitter baseband processors 852, a set of transmitter MACs 854, a transmitter transport encapsulator 856, an encryption device 858, a set of media encoders 860, a pre-processor 862, and a series of data bridges 830-842 providing optional data paths from various receiver devices 810-822 and transmitter devices 850-862.

While the exemplary receiving device 210 of FIG. 7 with its exemplary central processing system 740 can perform a large variety of communications services, the present discussion is limited to descriptions involving media reception from an intermediate device, such as the first wireless unit 150 of FIG. 2.

In operation, the RFFE(s) 810 may receive a media stream encoded according to any of the variants described above, including the dynamic and differential media-encoded streams, media streams using dynamic and differential error coding and so on. Generally, such media streams may be received and processed using the various receiver devices 810-822 to produce a processed media stream suitable for display and/or listening.

In order to correctly process the received media stream, the relevant coding information regarding media-coding, outer-coding, inner-coding, compression and encryption must be known or capable of being determined. Accordingly, in various configurations the central processing system 740 may be configured at the applications level based on initial negotiations with a media content transmitting device. For example, in various configurations, the first wireless unit 150 and receiving device 210 of FIG. 2 can make an initial communication using default parameters. Subsequently, the receiving device 210 can pass information about the forward data communications channel, such as signal strength and SNR, as well as information regarding preferences and limitations of the receiving device 210, to the first wireless unit 150. Accordingly, an appropriate regime of media-coding, error-coding, compression and so on, may be selected and implemented by both the first wireless unit 150 and the receiving device 210.

For situations where dynamic coding is used, the information describing various coding changes may be encapsulated within a received stream of multimedia data. For example, for situations where changes of media-coding, inner-coding and outer-coding are made to a received stream of multimedia data, various embedded flags within the stream of multimedia data may be extracted by transport parser 816 and subsequently provided to the applications processor(s) 870 where coding selections may be made based upon the extracted flags. Subsequent to these coding selections, the central processing system 740 may be made to appropriately de-interleave, apply the appropriate changes in outer-coding, the appropriate changes in inner-coding and so on.

Despite precautions to provide robust error-coding for critical information, it should be appreciated that there may be instances where such critical information, such as changes in outer-coding, may be sent multiple times or perhaps be re-transmitted if circumstances permit.

Functional Operation

Figure 9:
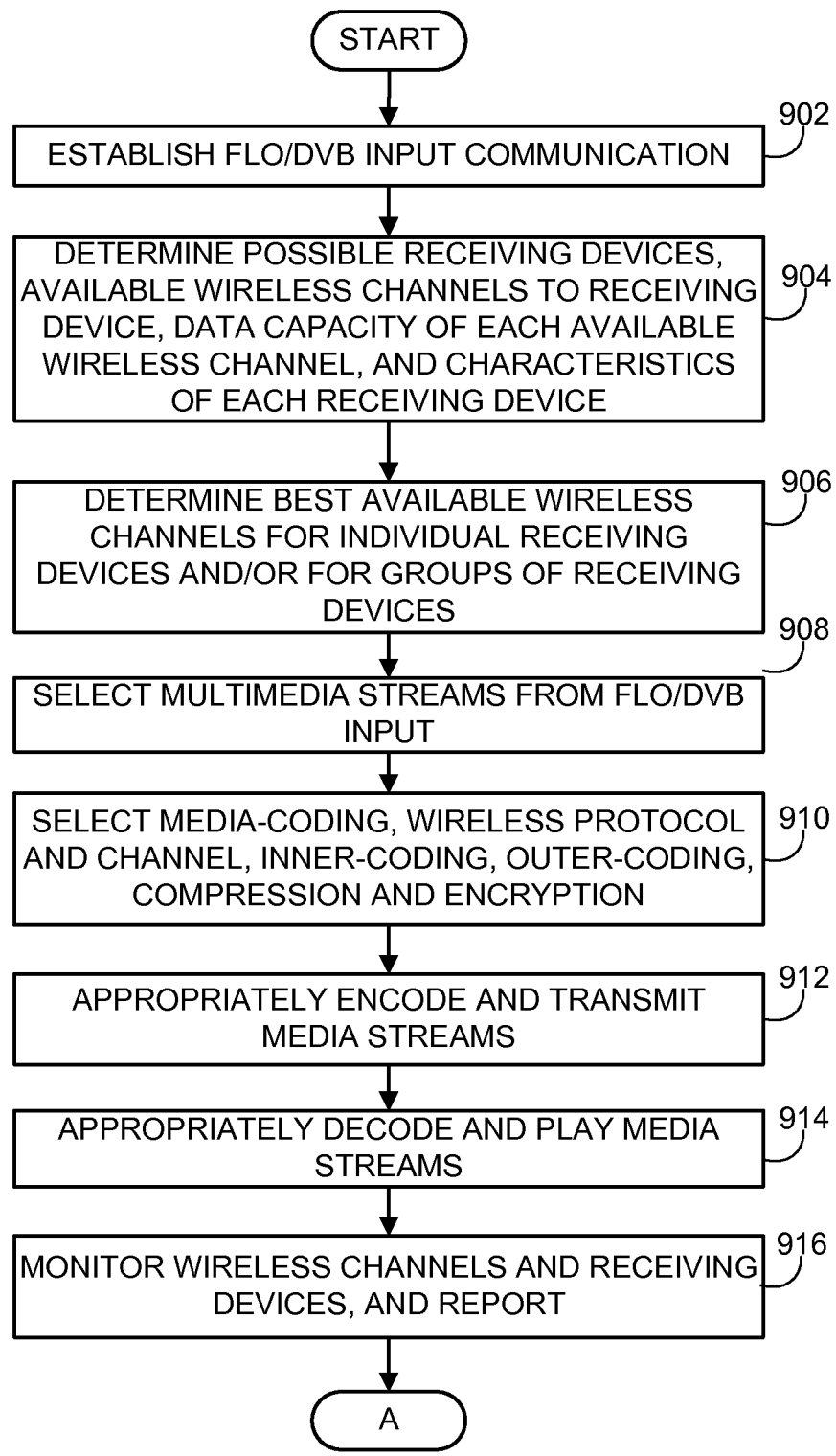
FIGS. 9 and 10 depict a flowchart outlining a number of exemplary operations of the disclosed methods and systems.
Figure 10:
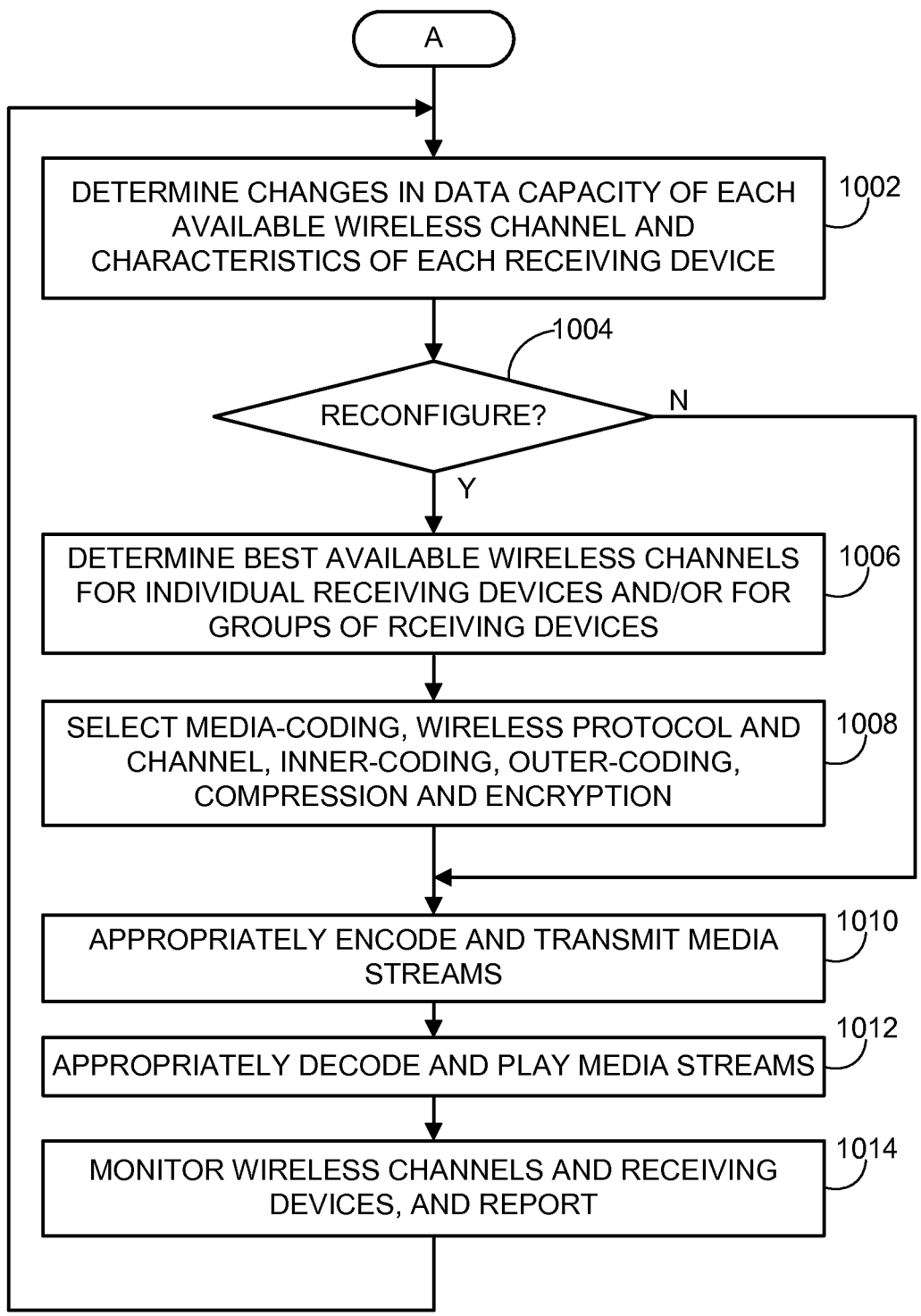

FIGS. 9 and 10 depict flowcharts outlining a number of exemplary operations of the disclosed methods and systems. The process of FIG. 9 starts in step 902 where a stream of DVB/FLO content is established between a DVB/FLO content delivery system and some intermediate device, such as the first wireless unit 150 of FIG. 2. Next, in step 904, a number of possible receiving devices for portions of the DVB/FLO content can be determined, as well as the available wireless and wired channels to each receiving device, the data transfer capacity of each channel (which may include certain channel information, such as a channel bit-error-rate, to fully describe), and characteristics of each receiving device. Control continues to step 906.

In step 906, the best (or otherwise appropriate) available wireless channels for individual and/or groups of receiving devices can be determined based on information gathered in step 904. Next, in step 908, the appropriate multimedia streams from the DVB/FLO content can be selected and extracted. Then, in step 910, the appropriate media coding, wireless protocol and channel, inner-coding, outer-coding, compression and encryption may be selected based upon the operations of steps 904-908. In various configurations, such selections may be made independent of one another or possibly be made according to some form of joint optimization where any combination of two or more of media coding, wireless protocol and channel, inner-coding, outer-coding, compression and encryption may be considered to improve or optimize media quality at the various receiving devices. Control continues to step 912.

In step 912, outgoing media streams forwarded to receiving devices may be appropriately encoded and transmitted according to the selections of step 9 10. Next, in step 914, the media streams encoded and transmitted in step 912 can be appropriately decoded and played. Then, in step 916, the various media content forwarding wireless channels and receiving devices may be monitored with the results reported to the intermediate transmitting device. Control then continues to step 1002 (FIG. 10).

In step 1002, the changes in data capacity of each available wireless channel, which may include both a data transfer channel presently being used as well alternative wireless channels between an intermediate transmitting device and a receiving device, may be determined. Next, in step 1004, a determination can be made as to whether to dynamically configure some aspect of each forward communication channel, such as changing wireless channels/protocols, changing media-coding, changing error coding, changing compression, changing encryption and so on. If some form of reconfiguration is necessary or otherwise desirable, control continues to step 1006; otherwise, control jumps down to step 1010.

In step 1006, the best (or otherwise appropriate) available wireless channels for individual and/or groups of receiving devices can be determined based on information gathered in steps 916. Generally, in situations where a new wireless channel is to be selected, the performance of the new wireless channel may exceed that of the existing wireless channel with some form of (optional) threshold(s) applied. Next, in step 1008, the appropriate media coding, wireless protocol and channel, inner-coding, outer-coding, compression and encryption may be re-selected based upon the previous steps to enable various forms of dynamic adaptation. Control continues to step 1010.

In step 1010, outgoing media streams forwarded to receiving devices may be appropriately encoded and transmitted according to the selections of step 910. Next, in step 1012, the media streams encoded and transmitted in step 912 can be appropriately decoded and played by a receiving device. Then, in step 1014, the various media content forwarding wireless channels and receiving devices may be further monitored with the results reported to the intermediate transmitting device. Control then continues to step 1002 to be repeated as may be necessary or desirable.

Priority of Video Data

In various configurations where video data is involved, the priority assigned to various portions of the video data stream may vary according to the types of data involved. For example, in an exemplary order of priority, video data can be prioritized at various levels according to Table 1 below:

TABLE 1

| Group | Information Type |
|---|---|
| 1 | Sequence Level Information: For example Sequence Parameter Sets (SPS) indicating codec type, resolution, frame rate etc of the video data. Sometimes, a transport encapsulation header for sequence level info may also include key info for Digital Rights Management (DRM). |
| 2 | Frame Level Information: which may be subdivided according to the following exemplary priority<br>a. Random access point I-frames<br>b. Independent Decoder Refresh (IDRs) or I-frames at the beginning of a closed group of pictures (gop)<br>c. I-frames<br>d. Gradual Decoder Refresh (GDR)<br>e. P-frames<br>f. Reference B-frames<br>g. Non-reference B-frames |
| 3 | Slice Level Information: For example, in the H.264 protocol, slice data partitioning is supported. This means that the data within each slice may be further divided into at least three parts based on the following exemplary priority:<br>a. Partition A: Metadata such as MB mode, MV etc.<br>b. Partition B: Intra-coefficient information for texture data<br>c. Partition C: Inter-coefficient information for texture data |
| 4 | Macro-Block (MB) Level Information:<br>a. MB mode, motion vector, and so on, may be considered more important that residual information.<br>b. Predictor coefficient information may be considered more important than residual information.<br>c. Within an MB, DC coefficients may be considered the most the important type of coefficient followed by low-frequency AC coefficients followed by high-frequency AC coefficients. |

In View of Table 1, it should be appreciated that priority can be assigned to a very detailed level, but in practice it may be beneficial to assign priority on a much more coarse basis. For example, the outer-coding selection device 644 may use three levels of priority (High, Medium and Low), and assign Group (1) information and I-Frame information high priority, assign the rest of Group (2) information medium priority, and the remaining Group (3) and Group (4) information low priority.

As information is prioritized, it should be appreciated that there may certain circumstances where some advantage to separating data having the same priority may arise. That is, there may be instances where some other factor(s) beside assigned priority may cause data of equal priority to be separately encapsulating into separate groups of packets and processed independently. For example, even though NAL sequence level information and interleaving depth information may be assigned the highest outer-coding strength priority, interleaving depth information may need to be separately packaged and error-coded since this data may need to be retrieved and processed as soon as possible at a receiving device.

Additionally, as information is prioritized, it should be appreciated that there may, in various optional configurations, be some advantage to grouping various data having the same priority before applying outer-coding even though these blocks don't occur sequentially. For example, as seen in FIG. 11A a video stream 1100 having various blocks of high, medium and low priority information may be re-arranged into the re-sequenced stream 1110 of FIG. 11B, where medium blocks of low and medium-priority information are grouped together respectively.

Continuing to FIG. 11C, the re-sequenced stream 1110 is conceptually depicted in separate groups of data 1122, 1124, 1126 and 1128 capable of being transported at 1130 in respective packet groups 1132, 1134, 1136 and 1138. By using the re-sequenced stream 1110, differential coding changes may be made less often as compared to using the original data stream 1100.

Note that there may be instances where different groups of data 1122, 1124, 1126 and 1128 at 1110 do not align with the boundaries of the respective packet groups 1132, 1134, 1136 and 1138 at 1130, leaving gaps $Z_1$, $Z_2$, and $Z_3$. In such instances these gaps $Z_1$, $Z_2$, and $Z_3$ may be zero-padded or possibly filled with other data that might otherwise be assigned a lower-priority. For example, the gap $Z_2$, at packet $P_{12}$ may be filled with low-priority data from somewhere else in stream 1100, while gap $Z_3$, at packet $P_{15}$ may be filled with low-priority or medium-priority data from somewhere else in stream 1100.

FIGS. 12A depicts another a video stream 1200 having various blocks of high, medium and low priority information that may be re-arranged into the "re-constructed" stream 1210 of FIG. 12B containing data groups 1212, 1214, 1216, 1218 and 1220 shown in context at 1230 with respective packet groups 1232, 1234, 1236, 1238 and 1240. As shown in FIG. 12B, low-priority data block $LOW_1$ can be included in (high-priority) packet group 1232 while low-priority data block $LOW_2$ can be separated onto two sub-blocks $LO_1$ and $LO_2$ with sub-block $LO_1$ incorporated into (medium-priority) packet group 1232. As with FIG. 11C, gaps $Z_1$, and $Z_2$ may be zero-padded or have other data incorporated therein. As with the example of FIGS. 11A-11C, using the re-constructed stream 1210 can allow for fewer differential coding changes.

Differential Outer Coding

Figure 13:
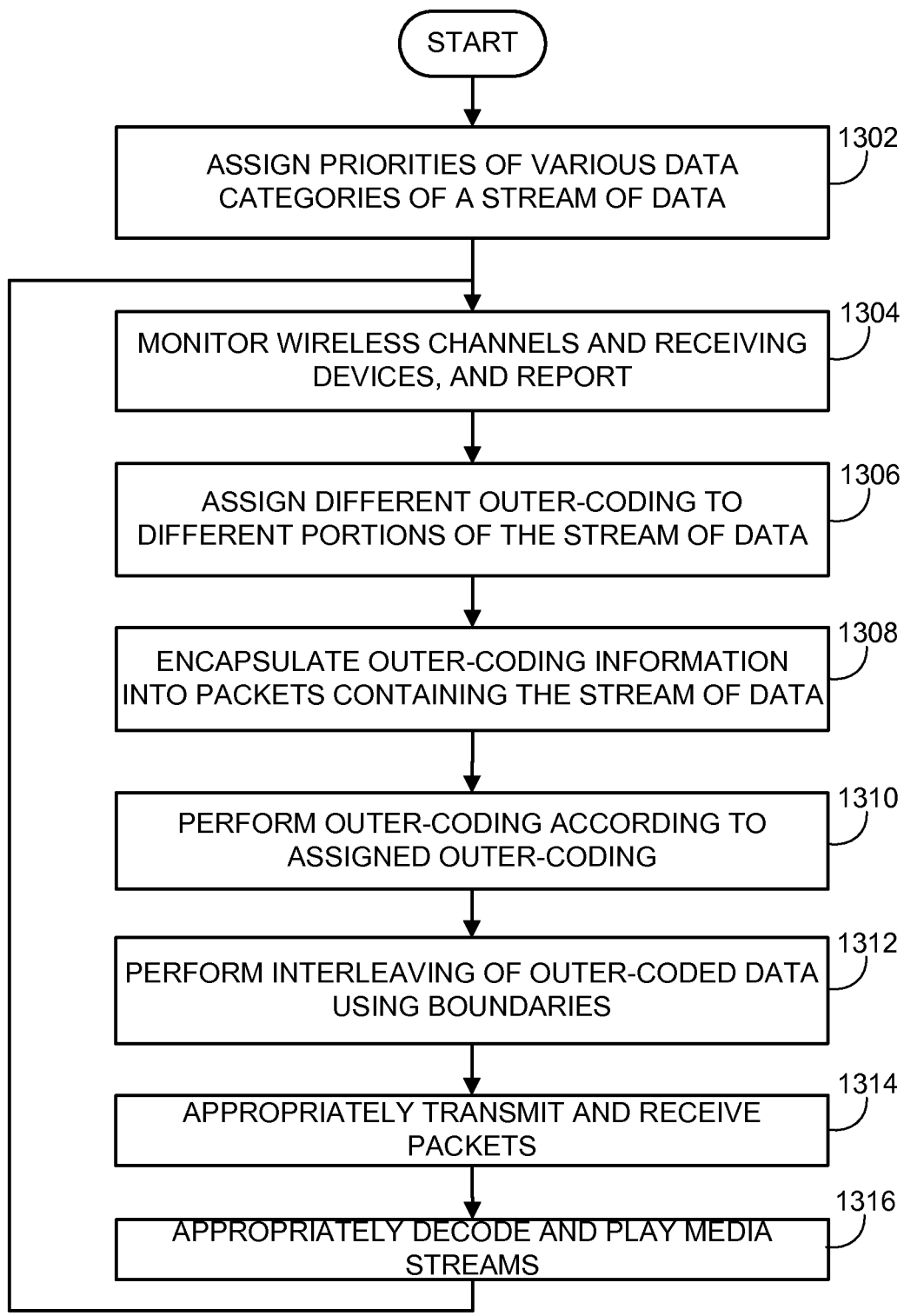
FIG. 13 depicts a flowchart outlining a number of second exemplary operations of the disclosed methods and systems.

FIG. 13 depicts a flowchart outlining a number of second exemplary operations of the disclosed methods and systems directed to differential outer-coding. The process starts in step 1302 where various data categories of a stream of data are assigned priorities. As mentioned above, priority assignment may be made based on a variety of circumstances, such as the importance of various video information types mentioned above in Table 1 and surrounding text. Next, in step 1304, the various media content forwarding wireless channels and receiving devices may be monitored with the results reported to the intermediate transmitting device responsible for managing error-coding. Control then continues to step 1306.

In step 1306, different outer-coding may be assigned to different portions of the stream of data to be transmitted based upon the prioritization of step 1302, and in step 1308, information describing changes in outer-coding may be encapsulated into a stream of packets containing the outgoing stream of data. As mentioned above, it should be appreciated that re-sequencing, zero-padding and padding using lower-prioritized data may be used in certain circumstances, which may be considered in encapsulation. Similarly, in other circumstances, it may be beneficial to separate data having an identical priority for the benefit of timely and efficient processing. Still further, the selection of priorities may or may not be affected by some form of joint optimization involving any combination of other forms of error-coding, media-coding, compression and so on. Control then continues to step 1310.

In step 1310, the differential outer-coding may be applied to the encapsulated data according to the selections and compromises of the previous steps. Next, in step 1312, interleaving of may be performed, and in various configurations interleaving may be controlled to preserve the boundaries of differential outer-coding changes. Control then continues to step 1314.

In step 1314, the outer-coded, (optionally) interleaved stream of data may be appropriately transmitted (a process that may involve inner-coding) and subsequently receive by one or more receiving devices. Next, in step 1316, the received stream of data may be appropriately decoded (perhaps or presumably using embedded flags or other coding-related information), and played for the benefit of a consumer. Control may then jump back to step 1304 (or in some configurations jump back to step 1302) where the process may be repeated as necessary or desired.

Energy Control

Figure 14:
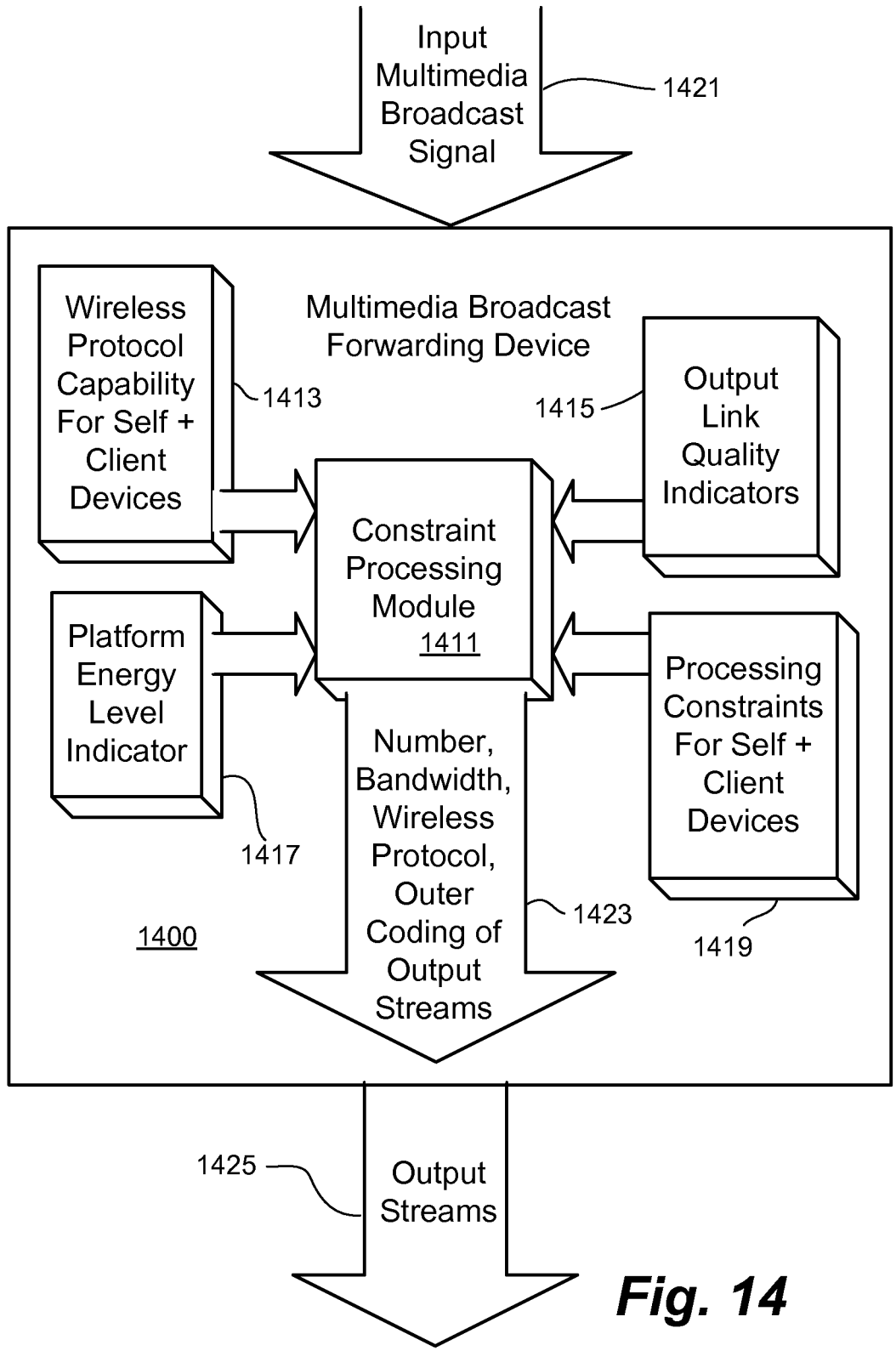
FIG. 14 is a diagram depicting energy use control used by a broadcast forwarding device.

FIG. 14 is a diagram depicting energy use control used by a broadcast forwarding device. Depicted is a multimedia broadcast forwarding device 1400, which includes constraint processing module 1411, wireless protocol capability module 1413, output link quality indicators module 1415, platform energy level indicator 1417 and processing constraints module 1419. Wireless protocol capability module 1413 provides data concerning the capabilities of the multimedia broadcast forwarding device 1400 and data concerning client devices. Processing constraints module 1419 likewise provides data concerning the processing constraints of the multimedia broadcast forwarding device 1400 and data concerning client devices.

The multimedia broadcast forwarding device 1400 receives input broadcast streams 1421. Constraint processing module 1411 then provides output data which includes number, bandwidth, wireless protocol and outer coding of output streams 1423. This is used by the multimedia broadcast forwarding device 1400 to provide output streams 1425 corresponding to the input broadcast streams 1421, but limited by the constraints processed by constraint processing module 1411.

In operation, constraint processing module 1411 controls the output streams 1425 by limiting the number and output power of the output streams 1425. In cases where the platform energy (platform energy level indicator 1417) is unrestrained, such as when powered by an external power source, the constraints are controlled by factors related to quality of service (QoS) without regard to energy consumption of the broadcast forwarding device 1400. In cases where available power is limited, constraint processing module 1411 adjusts output to some or all client devices or, alternatively, reconfigures the broadcast parameters to reduce energy consumption. Examples are using less energy consumption intensive coding, reducing the number of channels, and so forth. In this vein, different protocols may be invoked to provide the necessary connection. By way of example, multimedia broadcast forwarding device 1400 may switch transmission from a cellular connection to an available 802.11 connection or any other connection that requires less energy consumption. By adjusting output to some or all client devices, the available service to those devices is improved. Thus if, for example, three data output streams would provide optimum QoS for the clients, but the available battery power for the multimedia forwarding device 1400 would ultimately limit service to the clients, constraint processing module 1411 would reduce the number and/or output power of the data output streams 1425 and attempt to switch or adjust the stream outputs to a less energy-intensive or less energy-consumptive format, protocol, channel bandwidth and so forth. In some cases, the amount of additional power required to transmit to clients in fringe reception areas may be such that QoS or the ability of the multimedia forwarding device 1400 to service other clients is compromised. Constraint processing module 1411 would in such cases determine which client devices to service or which client devices to optimize service for if adjustments cannot be accommodated by the broadcast forwarding device 1400.

There are some cases in which the available energy to provide an otherwise optimum number of output streams 1425 or optimum power at the output streams 1425 is limited. The result would be that the multiple output stream capability would diminish overall QoS rather than enhance it. In such cases, constraint processing module 1411 would limit the number of the output streams 1425 and/or the power at the output streams 1425 while attempting to "re-route" or adjust connections.

It is further possible to provide a "pass-through" functionality of the broadcast forwarding device 1400. In cases where processing of the data by the broadcast forwarding device 1400 would be more energy consumptive than merely passing through the signals in an unaltered state, the broadcast forwarding device 1400 may use the "pass-through" technique, even if the "pass-through" of the unaltered signal may not result in the most optimal retransmission. One factor in this determination would be the total energy consumption from internal processing verses the increased energy consumption from using a "pass-through" technique.

As is implicit from the description above, the inputs used by constraint processing module 1411 include various factors as provided to constraint processing module 1411 by modules 1413, 1415, 1417 and 1419. Wireless protocol capability module 1413 provides data concerning the capabilities of the multimedia broadcast forwarding device 1400 and data concerning the client devices. Output link quality data is provided by the output link quality indicators module 1415. The energy available to the multimedia broadcast forwarding device 1400 is provided by the platform energy level indicator 1417, which provides "battery indicator" functions to indicate power available from internal and external power sources. Processing constraints module 1419 provides data concerning the processing constraints of the multimedia broadcast forwarding device 1400 and data concerning the client devices. The parameters used by constraint processing module 1411 and provided by modules 1413, 1415, 1417 and 1419 can be either preset or adjusted.

It should be noted that the elements described above, in connection with FIG. 14 can be provided as discrete modules or may be provided as a chipset including at least one monolithic integrated circuit.

Conclusion

In various configurations where the above-described systems and/or methods are implemented using a programmable device, such as a computer-based system or programmable logic, it should be appreciated that the above-described systems and methods can be implemented using any of various known or later developed programming languages, such as "C", "C++", "FORTRAN", Pascal", "VHDL" and the like.

Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform the above-described systems and/or methods.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods related to communications.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A wireless communication device for distributing media to one or more receiving apparatus, comprising:
    receiving circuitry to receive a first wireless multimedia broadcast signal containing individual media streams;
    extraction circuitry to extract the individual media streams including at least a first media stream from the received multimedia broadcast signal;
    transmitting circuitry to wirelessly transmit each of the individual media streams simultaneously to respective ones of a plurality of receiving apparatus via different wireless channels using different wireless signal protocols;
    decision circuitry to select a wireless signal protocol from the different wireless signal protocols based on variable wireless conditions local to the wireless communication device including a forward-link data capacity of each of the different wireless channels between the transmitting circuitry and each of the plurality of receiving apparatus, to control the transmitting circuitry to transmit the first media stream to at least one receiving apparatus by the selected wireless signal protocol, to determine a more advantageous one of the different wireless signal protocols for a switch of protocols based on information regarding existence and status of the different wireless channels using the different wireless signal protocols, and to switch from the selected wireless signal protocol to the more advantageous wireless signal protocol to transmit the first media stream from the transmitting circuitry to the at least one receiving apparatus in response to the more advantageous wireless signal protocol being determined; and
    handoff circuitry responsive to the decision circuitry to control the transmitting circuitry to switch protocols.

2. The device of claim 1, wherein the receiving circuitry has a capability of receiving a wireless multimedia broadcast signal containing a plurality of different media streams, at least a subset of the media streams provided under different multimedia protocols.

3. The device of claim 2, wherein at least a subset of the media streams comprises multimedia broadcast transmission signals selected from the group of Forward Link Only (FLO), DVB-H, DVB-SH, ATSC M/H, DVB-T, ISDB-T and S-DMB signals.

4. The device of claim 3, further comprising:
    extraction circuitry to extract individual media streams from the received wireless multimedia broadcast signal,
    wherein the wireless multimedia broadcast signal contains a plurality of audio-visual media streams.

5. The device of claim 1, wherein the decision circuitry has a capability of controlling the transmitting circuitry responsive to at least one of a signal environment and a capability of a plurality of the receiving apparatus.

6. The device of claim 1, wherein the decision circuitry has a capability of receiving feedback information from the receiving devices representative of wireless reception by the receiving devices.

7. The device of claim 6, wherein:
    the information representative of the forward-link data capacity includes channel quality information of the wireless channels between the transmitting circuitry and each receiving apparatus; and
    the transmitting circuitry transmits media streams to receiving apparatus using the different wireless signal protocols, including include at least two of Bluetooth, an 802.11 variant, an 802.15 variant, and Ultra Wide Band (UWB).

8. The device of claim 6, wherein:
    the decision circuitry has a capability of dynamically changing a version of the first data stream based upon changes of the forward-link data capacity of at least one wireless channel between the transmitting circuitry and each receiving apparatus carrying the first media stream.

9. The device of claim 6, wherein the decision circuitry selects among different versions or protocols of the first data stream based on the visual resolution of a display of each receiving apparatus.

10. The device of claim 9, wherein the different versions or protocols of at least one of the individual media streams with one of the different versions or protocols having at least one of a lesser quality and a lesser bandwidth requirement than another one of the different versions or protocols.

11. The device of claim 1, wherein the decision circuitry has a capability of dynamically reallocating transmit resources of the transmitting circuitry based upon changes of the forward-link data capacity of at least one wireless channel between the transmitting circuitry and each receiving apparatus.

12. The device of claim 1, wherein the decision circuitry has a capability of causing the transmitting circuitry to add an additional transmit signal to transmit the first media stream such that a receiving apparatus having a diminishing forward-link data capacity will continue to receive the first media stream.

13. The device of claim 1, wherein the decision circuitry has a capability of automatically selecting a media-coding scheme for the media-coded stream of data based on at least one of a wireless communication standard used between the transmitting circuitry and the receiving apparatus, a data transfer capacity of a wireless channel between the transmitting circuitry and the receiving apparatus and information provided by the receiving apparatus about a physical characteristic of the receiving apparatus.

14. The device of claim 1, further comprising:
the receiving circuitry to receive the first wireless multimedia broadcast signal containing a plurality of different media streams for the extraction of the individual media streams; and
the decision circuitry coupled to the transmitting circuitry to allocate at least one of the one or more wireless channels based on at least one of data bandwidth and channel quality of each wireless transmit channel.

15. The device of claim 1, further comprising:
an outer-coding circuit to dynamically change an outer-coding scheme for a first stream of data to use one of a plurality of available outer-coding schemes with each outer-coding scheme having a different level of robustness to produce a dynamically outer-coded stream of data; and
the transmitting circuitry to transmit the dynamically outer-coded stream of data to a receiving apparatus.

16. The device of claim 1, further comprising:
decryption circuitry including a decryption key to decrypt one or more of the encrypted media streams to produce at least a decrypted first media stream;
the transmitting circuitry to encrypt and transmit one or more of the individual media streams to the one or more receiving apparatuses using one or more transmit signals;
media control circuitry to control the distribution of the first media stream to at least one receiving apparatus via the transmitting circuitry, and to provide the at least one receiving apparatus with at least a first session key enabling the at least one receiving apparatus to access the first media stream.

17. The device of claim 16, wherein the decryption circuitry has a capability of permitting reception "pass-through" transmissions or transmissions of a reduced encryption without decryption processing.

18. The device of claim 1, further comprising:
a protocol selection circuit to cause the transmitting circuitry to change transmission of the first stream of payload information from a first communication channel using a first one of the different wireless signal protocols to a second communication channel using a second one of the different wireless signal protocols without appreciable interruption of data flow between the transmitting circuitry and the first receiving apparatus; and
the transmitting circuitry comprising a plurality of transmitting circuits each to transmit a first stream of payload information to a first receiving apparatus using the different wireless signal protocols; and
the decision circuitry to perform receiving information relating to a change of wireless signal protocol from the first receiving apparatus.

19. The device of claim 1, further comprising:
an outer-coding circuit to differentially change an outer-coding scheme for a first stream of data to use one of a plurality of available outer-coding schemes with each outer-coding scheme having a different level of robustness to produce a differentially outer-coded stream of data; and
the transmitting circuitry to transmit the differentially outer-coded stream of data to a receiving apparatus.

20. The device of claim 1, further comprising:
a constraint processing module, responsive to at least one factor related to a capability of the of the wireless communication device to provide service to ones of the receiving devices at a predetermined quality of service (QoS), by limiting the transmission of one or more wireless transmit signals to the client devices in accordance with the capability of the wireless communication device.

21. The device of claim 20, wherein the factors related to the capability of the wireless communication device to provide service comprises at least one of a wireless protocol capability of the receiving devices, output link quality data, energy available to the multimedia broadcast forwarding device or "battery indicator" data, processing constraints of the multimedia broadcast forwarding device, and processing constraints of the receiving devices.

22. The device of claim 20, further comprising:
a wireless protocol capability module providing the constraint processing module with data concerning a wireless protocol capability of the receiving devices;
an output link quality indicators module providing the constraint processing module with data concerning a output link quality data;
a platform energy level indicator providing the constraint processing module with data concerning energy available to the multimedia broadcast forwarding device or "battery indicator" data; and
a processing constraints module providing the constraint processing module with data concerning processing constraints of the multimedia broadcast forwarding device and processing constraints of the receiving devices, the constraint processing module, responsive to at least one factor related to a capability of the of the wireless communication device to provide service to ones of the receiving devices, by limiting the transmission of said one or more wireless transmit signals to the client devices in accordance with the capability of the wireless communication device based on at least one of a wireless communication standard used between the transmitting circuitry and the receiving apparatus, a data transfer capacity of a wireless channel between the transmitting circuitry and the receiving apparatus and information provided by the receiving apparatus, wherein the information provided by the receiving device comprises information provided by the receiving apparatus about a physical characteristic of the receiving apparatus.

23. The device of claim 20, wherein:
the constraint processing module controls the transmission of the one or more individual media streams simultaneously to the one or more receiving apparatus using one or more wireless transmit signals by limiting the number and output power of the output streams;
in the case of surplus availability of platform energy, reduces or eliminates restraint on the number and output power of the output streams responsive to availability of platform energy; and in cases of limited availability of platform energy, the constraint processing module limits output in order to provide service to at least some client devices with at least a predetermined quality of service (QoS).

24. The device of claim 23, wherein the information provided by the receiving device comprises information provided by the receiving apparatus about an ability of the receiving apparatus to process signals selected from the group of Forward Link Only (FLO), DVB-H, DVB-SH, ATSC M/H, DVB-T, ISDB-T and S-DMB signals.

* * * * *